United States Patent
Ahn et al.

(10) Patent No.: US 11,040,352 B2
(45) Date of Patent: Jun. 22, 2021

(54) SYSTEM FOR MELTING ALUMINUM AND RECYCLING BLACK DROSS

(71) Applicant: DS LIQUID CO., LTD, Ansan-si (KR)

(72) Inventors: Byung-Doo Ahn, Seoul (KR); Yong Kook Shin, Seoul (KR); Soo Hyun Yun, Seoul (KR)

(73) Assignee: DS LIQUID CO., LTD., Ansan-si (KR)

( * ) Notice: Subject to any disclaimer, the term of this patent is extended or adjusted under 35 U.S.C. 154(b) by 0 days.

(21) Appl. No.: 15/779,993

(22) PCT Filed: Dec. 14, 2016

(86) PCT No.: PCT/KR2016/014659
§ 371 (c)(1),
(2) Date: May 30, 2018

(87) PCT Pub. No.: WO2017/105083
PCT Pub. Date: Jun. 22, 2017

(65) Prior Publication Data
US 2018/0369827 A1    Dec. 27, 2018

(30) Foreign Application Priority Data
Dec. 14, 2015  (KR) .......................... 10-2015-0177933

(51) Int. Cl.
*B02C 21/00* (2006.01)
*C02F 1/06* (2006.01)
(Continued)

(52) U.S. Cl.
CPC ............ *B02C 21/00* (2013.01); *B01D 21/262* (2013.01); *B01D 35/02* (2013.01); *B01F 3/12* (2013.01);
(Continued)

(58) Field of Classification Search
CPC ......... B01D 21/262; B01D 35/02; B01F 3/12; B02C 21/00; B02C 23/08; B02C 23/10;
(Continued)

(56) References Cited

U.S. PATENT DOCUMENTS 4,126,673 A * 11/1978 Cromwell ................. B02C 4/02
241/14
4,128,415 A * 12/1978 van Linden ............. C22B 7/003
266/44
(Continued)

FOREIGN PATENT DOCUMENTS

| JP | 1983-067834 | 4/1983 |
| JP | 1988-014055 | 3/1988 |

(Continued)

OTHER PUBLICATIONS

Boin, U. et al., State of the art in secondary aluminum production with regard to the IPPC guideline, Umweltbundesamt Osterreich, Vienna, 2000.

*Primary Examiner* — Scott R Kastler
*Assistant Examiner* — Michael Aboagye

(57) ABSTRACT

The present invention relates to a system for melting aluminum and recycling black dross, including an aluminum melting furnace responsible for melting aluminum scraps in molten aluminum and a black dross recycling device responsible for recycling black dross generated when the aluminum scraps are melted in the molten aluminum.

The aluminum melting furnace includes a heating chamber provided with heating units responsible for heating the molten aluminum; and a melting chamber provided with an eddy unit responsible for generating an eddy descending in a spiral in the molten aluminum, a flux supply unit responsible for adding a flux to the eddy, and a raw material supply unit responsible for adding the aluminum scraps to the eddy, wherein, in the eddy unit, black dross formed when inclu- (Continued)

sions contained in the molten aluminum are captured by the flux is repeatedly descended and floated in the molten aluminum through the eddy, so that the black dross is collected into a spherical shape to form spherical black dross, and the black dross recycling device is responsible for recycling the spherical black dross.

9 Claims, 12 Drawing Sheets

(51) Int. Cl.
| | |
|---|---|
| C02F 1/38 | (2006.01) |
| B01D 21/26 | (2006.01) |
| C22B 21/06 | (2006.01) |
| B02C 23/10 | (2006.01) |
| B03B 5/34 | (2006.01) |
| B02C 23/14 | (2006.01) |
| B02C 23/20 | (2006.01) |
| B04B 1/00 | (2006.01) |
| B03B 5/28 | (2006.01) |
| B02C 23/08 | (2006.01) |
| B09B 3/00 | (2006.01) |
| B01F 3/12 | (2006.01) |
| C22B 21/00 | (2006.01) |
| B07B 1/28 | (2006.01) |
| B07B 1/22 | (2006.01) |
| B01D 35/02 | (2006.01) |
| B07B 1/36 | (2006.01) |
| C02F 103/16 | (2006.01) |

(52) U.S. Cl.
CPC .............. *B02C 23/08* (2013.01); *B02C 23/10* (2013.01); *B02C 23/14* (2013.01); *B02C 23/20* (2013.01); *B03B 5/28* (2013.01); *B03B 5/34* (2013.01); *B04B 1/00* (2013.01); *B07B 1/22* (2013.01); *B07B 1/28* (2013.01); *B09B 3/00* (2013.01); *C02F 1/06* (2013.01); *C02F 1/38* (2013.01); *C22B 21/00* (2013.01); *C22B 21/06* (2013.01); *B07B 1/36* (2013.01); *C02F 2103/16* (2013.01); *Y02P 10/20* (2015.11)

(58) Field of Classification Search
CPC ........... B02C 23/14; B02C 23/20; B03B 5/28; B03B 5/34; B04B 1/00; B07B 1/22; B07B 1/28; B09B 3/00; C02F 1/06; C02F 1/38; C22B 21/00; C22B 21/06
USPC ......... 266/137, 219, 900, 901, 275, 44, 233, 266/235, 227; 75/686, 687, 678
See application file for complete search history.

(56) References Cited

U.S. PATENT DOCUMENTS

| | | | | |
|---|---|---|---|---|
| 4,386,764 | A | * | 6/1983 | Claxton .................. C22B 7/003 266/235 |
| 4,569,723 | A | | 2/1986 | Lyon et al. |
| 4,598,899 | A | * | 7/1986 | Cooper .................. C22B 7/003 266/212 |
| 5,102,453 | A | * | 4/1992 | Yerushalmi ......... C22B 21/0007 75/416 |
| 5,198,200 | A | | 3/1993 | Yerushalmi et al. |
| 5,268,020 | A | | 12/1993 | Claxton |
| 5,290,535 | A | * | 3/1994 | Zuck ........................ C01D 3/08 423/131 |
| 5,294,245 | A | * | 3/1994 | Gilbert ...................... C21C 7/00 266/235 |
| 6,217,823 | B1 | * | 4/2001 | Vild ........................ C22B 7/003 266/216 |
| 6,296,817 | B1 | | 10/2001 | Park et al. |
| 9,803,922 | B2 | * | 10/2017 | Chandler .................. F27B 3/19 |

FOREIGN PATENT DOCUMENTS

| | | |
|---|---|---|
| KR | 10-0815062 B1 | 3/2008 |
| KR | 10-2010-012279 | 11/2010 |
| KR | 10-1048230 B1 | 7/2011 |
| KR | 10-1393109 B1 | 5/2014 |
| KR | 10-1425572 B1 | 7/2014 |
| WO | WO 92-07967 A1 | 5/1992 |

* cited by examiner

| Element | Weight% | Atomic% |
|---|---|---|
| Na | 19.17 | 27.38 |
| Cl | 54.48 | 50.48 |
| K | 26.35 | 22.14 |
| Totals | 100.00 | 100.00 |

| Element | Weight% | Atomic% |
|---------|---------|---------|
| O | 55.96 | 67.42 |
| Mg | 14.32 | 11.35 |
| Al | 27.72 | 21.23 |
| Totals | 100.00 | 100.00 |

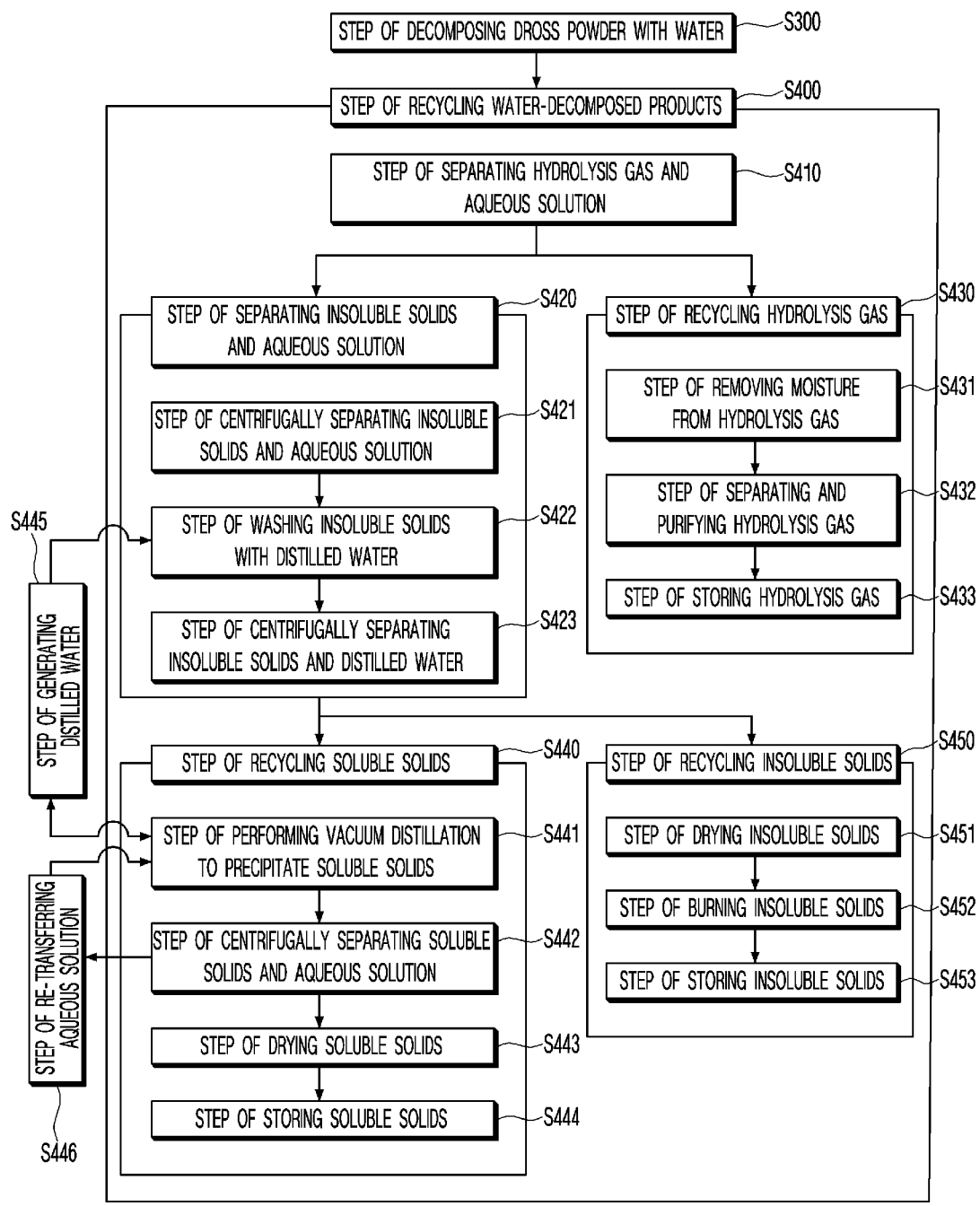

SYSTEM FOR MELTING ALUMINUM AND RECYCLING BLACK DROSS

TECHNICAL FIELD

The present invention relates to a system for melting aluminum and recycling black dross, and a method of melting aluminum and recycling black dross, wherein the system and method are applied to perform a process of melting aluminum scraps and a process of recycling black dross.

This application claims priority to Korean Patent Application No. 10-2015-0177933, filed on Dec. 14, 2015 in the Korean Intellectual Property Office, the disclosure of which is incorporated herein by reference.

BACKGROUND ART

Various aluminum parts used in automobiles, household appliances, and construction materials are manufactured using an aluminum casting device. At this time, an aluminum melting furnace is responsible for supplying molten aluminum to the aluminum casting device. The aluminum melting furnace is a device for melting molded aluminum scraps of a certain size at high temperature.

A conventional aluminum melting furnace includes a temperature rising chamber equipped with a burner for heating molten aluminum, a molten metal stirring chamber equipped with a molten metal pump for pumping molten aluminum discharged from the temperature rising chamber, and a charging chamber for charging an aluminum compression chip mass into molten aluminum discharged from the molten metal stirring chamber.

Here, the aluminum compression chip mass, which is also called an aluminum ingot, is obtained by compressing a large number of aluminum chips generated during production or processing of aluminum products. At this time, voids are generated in the process of compressing aluminum chips, and as a result, a large number of voids are contained in the aluminum compression chip mass. Therefore, in the case of the conventional aluminum melting furnace, heat is not sufficiently transferred to the center portion of an aluminum compression chip mass charged into molten aluminum, such that melting efficiency may be lowered. Also, the aluminum compression chip mass may float on the surface of molten aluminum, and as a result, the aluminum compression chip mass may be brought into contact with the atmosphere to generate aluminum oxide.

To solve the above-described problems caused by used of the conventional aluminum melting furnace, a method of adding an aluminum compression chip mass to molten aluminum, which is pumped from a molten metal stirring chamber and then transferred to a charging chamber, is also used. However, even in this case, due to the low specific gravity of the aluminum compression chip mass, melting proceeds in a state wherein the aluminum compression chip mass is suspended in the molten aluminum. Therefore, when the conventional aluminum melting furnace is used, melting efficiency is lowered, and the amount of generated aluminum oxide is increased, and thus yield of pure aluminum is lowered.

Meanwhile, since aluminum is a metal having high oxidizing properties, aluminum oxide is generated in the process of melting aluminum in molten aluminum. When the amount of generated aluminum oxide is increased, the recovery rate of aluminum is lowered. In addition, paint and other inclusions are generally contained in the aluminum mass, which is added to molten aluminum. As the amount of such inclusions increases, the purity of aluminum decreases.

To solve problems caused by such aluminum oxide and inclusions, molten aluminum is treated with a flux capable of preventing oxidation of aluminum and capable of capturing inclusions. Dross generated when molten aluminum is treated with a flux is called a black dross.

Until now, no method has been proposed to effectively recycle black dross so that materials contained in the black dross, such as aluminum, aluminum oxide, flux, and the like, can be recycled according to the application. Thus, generated black dross is discarded. At the time of disposal, black dross is buried in the soil, which causes environmental pollution and waste of resources.

DISCLOSURE

Technical Problem

Therefore, the present invention has been made in view of the above problems, and it is one object of the present invention to provide a system for melting aluminum and recycling black dross, wherein the system has an improved structure that increases the efficiency of melting aluminum scraps.

It is another object of the present invention to provide a system for melting aluminum and recycling black dross, wherein the system has an improved structure that reduces the amount of aluminum oxide generated.

It is another object of the present invention to provide a system for melting aluminum and recycling black dross, wherein the system has an improved structure that increases the recovery rate of melted pure aluminum.

It is yet another object of the present invention to provide a system for melting aluminum and recycling black dross, wherein the system has an improved structure that facilitates recycling of compositions contained in black dross.

Technical Solution

In accordance with one aspect of the present invention, provided is a system for melting aluminum and recycling black dross, including an aluminum melting furnace responsible for melting aluminum scraps in molten aluminum and a black dross recycling device responsible for recycling black dross generated when the aluminum scraps are melted in the molten aluminum, wherein the aluminum melting furnace includes a heating chamber provided with heating units responsible for heating the molten aluminum; and a melting chamber provided with an eddy unit responsible for generating an eddy descending in a spiral in the molten aluminum, a flux supply unit responsible for adding a flux to the eddy, and a raw material supply unit responsible for adding the aluminum scraps to the eddy, wherein, in the eddy unit, black dross formed when inclusions contained in the molten aluminum are captured by the flux is repeatedly descended and floated in the molten aluminum through the eddy, so that the black dross is collected into a spherical shape to form spherical black dross, and the black dross recycling device is responsible for recycling the spherical black dross.

Preferably, the black dross recycling device includes a crushing/pulverizing unit responsible for crushing and pulverizing the spherical black dross to split the spherical black dross into aluminum granules and dross particulate powder; a water decomposition unit responsible for reacting the dross particulate powder with water to decompose the dross particulate powder into soluble solids and insoluble solids; and a precipitation unit responsible for distilling an aqueous solution generated when the soluble solids are dissolved in the water so that the soluble solids are precipitated from the aqueous solution.

Preferably, the black dross recycling device further includes a soluble solids storage unit responsible for drying and storing the soluble solids precipitated in the precipitation unit; an aluminum granule storage unit responsible for storing the aluminum granules; and an insoluble solids storage unit responsible for drying and storing the insoluble solids.

Preferably, the crushing/pulverizing unit includes a crusher responsible for crushing the spherical black dross to split the spherical black dross into aluminum granules and dross powder; and a pulverizer responsible for pulverizing the dross powder to split the dross powder into aluminum granules and the dross particulate powder.

Preferably, the crushing/pulverizing unit further includes a first separating member that is disposed between the crusher and the pulverizer and is responsible for separating the aluminum granules and the dross powder from each other, transferring the aluminum granules to the aluminum granule storage unit, and transferring the dross powder to the pulverizer; and a second separating member that is disposed between the pulverizer and the water decomposition unit and is responsible for separating the aluminum granules and the dross particulate powder from each other, transferring the aluminum granules to the aluminum granule storage unit, and transferring the dross particulate powder to the water decomposition unit.

Preferably, the aluminum scraps include at least aluminum used beverage cans scraps, and the flux includes 93 to 97 parts by weight of a mixture, in which sodium chloride (NaCl) and potassium chloride (KCl) are mixed in equal parts by weight, and 3 to 7 parts by weight of a cryolite (potassium cryolite).

Preferably, the water decomposition unit includes a reactor responsible for stirring the dross particulate powder with water; and a first centrifugal separator responsible for centrifugally separating the aqueous solution and the insoluble solids.

Preferably, the precipitation unit includes a vacuum distiller responsible for vacuum-distilling the aqueous solution at predetermined vacuum distillation temperature and vacuum distillation pressure to precipitate the soluble solids; and a second centrifugal separator responsible for centrifugally separating the soluble solids precipitated in the vacuum distiller and the aqueous solution.

Preferably, in the first centrifugal separator, the insoluble solids separated from the aqueous solution by centrifugation are washed with the distilled water generated by vacuum distillation.

Preferably, the water decomposition unit further includes a gas collector responsible for collecting hydrolysis gas generated when the dross particulate powder is reacted with water.

Preferably, the black dross recycling device further includes a gas storage unit responsible for storing the hydrolysis gas collected in the gas collector.

In accordance with another aspect of the present invention, provided is a method of melting aluminum and recycling black dross, including (A) a step, in which aluminum scraps and a flux are added to an eddy formed in molten aluminum to melt the aluminum scraps in the molten aluminum, and black dross formed when inclusions contained in the molten aluminum are captured by the flux is repeatedly descended and floated in the molten aluminum through the eddy, so that the black dross is collected into a spherical shape to form spherical black dross; (B) a step of crushing and pulverizing the spherical black dross to split the spherical black dross into aluminum granules and dross particulate powder; (C) a water decomposition step, in which the dross particulate powder is decomposed in the presence of water, so that the dross particulate powder is decomposed into hydrolysis gas, soluble solids, and insoluble solids; and (D) a step of treating at least one species of the aluminum granules, the hydrolysis gas, the soluble solids, and the insoluble solids so as to be recyclable.

Preferably, step (B) includes (B1) a step of crushing the spherical black dross; (B2) a step of separating the aluminum granules and dross powder from each other in the crushed products of the spherical black dross; and (B3) a step of separating the aluminum granules and the dross particulate powder from each other in the pulverized products of the dross powder.

Preferably, step (D) includes (D1) a step of melting the aluminum granules in the molten aluminum for recycling.

Preferably, the aluminum scraps include at least aluminum used beverage cans scraps, and the flux includes 93 to 97 parts by weight of a mixture, in which sodium chloride (NaCl) and potassium chloride (KCl) are mixed in equal parts by weight, and 3 to 7 parts by weight of a cryolite (potassium cryolite).

Preferably, step (D) includes (D2) a step of collecting and separating the hydrolysis gas; and (D3) a step of separating an aqueous solution generated when the soluble solids are dissolved in the water and the insoluble solids from each other.

Preferably, step (D) further includes (D4) a step of treating the hydrolysis gas so as to be recyclable, wherein step (D4) includes (D4a) a step of removing moisture contained in the hydrolysis gas; (D4b) a step of separating and purifying the hydrolysis gas; and (D4c) a step of storing the hydrolysis gas.

Preferably, step (D) further includes (D5) a step of treating the soluble solids so as to be recyclable, wherein step (D5) includes (D5a) a step of vacuum-distilling the aqueous solution at predetermined vacuum distillation temperature and vacuum distillation pressure to precipitate the soluble solids from the aqueous solution; (D5b) a step of centrifugally separating the soluble solids and the aqueous solution; (D5c) a step of drying the soluble solids; and (D5d) a step of storing the soluble solids.

Preferably, step (D5) further includes (D5e) a step of condensing water vapor generated when the aqueous solution is vacuum-distilled in step (D5a) to generate distilled water, wherein step (D3) includes (D3a) a step of centrifugally separating the insoluble solids and the aqueous solution; (D3b) a step of washing the insoluble solids with the distilled water; and (D3c) a step of centrifugally separating the insoluble solids and the distilled water.

Preferably, step (D) further includes (D6) a step of treating the insoluble solids so as to be recyclable, wherein step (D6) includes (D6a) a step of drying the insoluble solids; (D6b) a step of burning the insoluble solids to convert hydrates contained in the insoluble solids into oxides; and (D6c) a step of storing the insoluble solids.

Advantageous Effects

The system for melting aluminum and recycling black dross, and the method of melting aluminum and recycling black dross according to the present invention have the following effects.

First, according to the system and method of the present invention, a flux selectively captures nonmetallic inclusions to generate black dross, and the generated black dross is collected into a spherical shape through an eddy to form spherical black dross. In this way, the amount of aluminum metal contained in the black dross can be reduced, and as a result, the recovery rate of melted pure aluminum can be increased.

Second, according to the system and method of the present invention, compositions having economic value contained in the spherical black dross can be recycled, thereby improving economic efficiency.

Third, according to the system and method of the present invention, the compositions contained in the spherical black dross can be recycled into aluminum granules, soluble solids, insoluble solids, and hydrolysis gas. In addition, among the compositions contained in the spherical black dross, compositions that are discarded without being recycled can be minimized, thereby further improving economic efficiency.

DESCRIPTION OF DRAWINGS

FIG. 18 is a flowchart for explaining the step of decomposing dross powder with water and the step of recycling water-decomposed products, which are specified in FIG. 16, in detail.

BEST MODE

Terms or words used herein shall not be limited to common or dictionary meanings, and have meanings corresponding to technical aspects of the embodiments of the present invention so as to most suitably express the embodiments of the present invention. Accordingly, the constructions of examples and drawings disclosed in the present specification are merely preferred embodiments of the present invention and do not represent the full technical spirit of the present invention. Therefore, it should be understood that various equivalents and modifications may have been present at a filling time of the present application.

Elements in the following drawings may be exaggerated, omitted, or schematically illustrated for conveniences and clarity of explanation, and the sizes of elements do not reflect their actual sizes completely. Detailed description of known functions and configurations incorporated herein will be omitted when it may make the subject matter of the present invention unclear.

Figure 1:
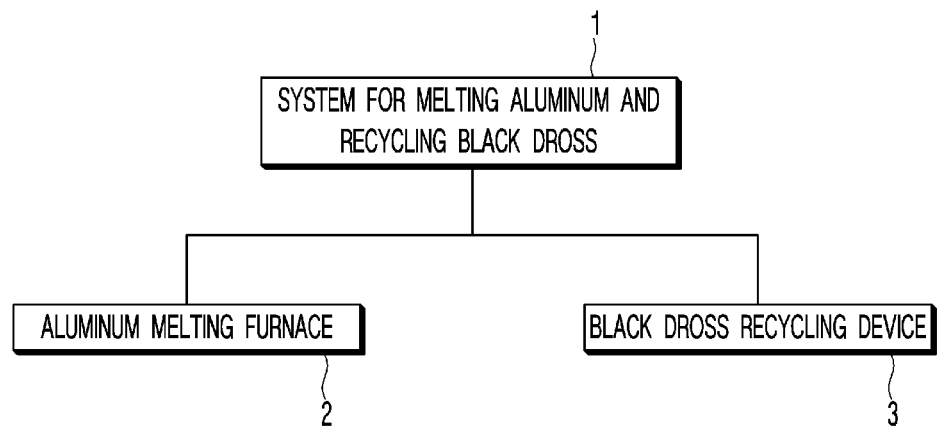
FIG. 1 is a block diagram schematically showing the system for melting aluminum and recycling black dross according to a preferred embodiment of the present invention.

FIG. 1 is a block diagram schematically showing the system for melting aluminum and recycling black dross according to a preferred embodiment of the present invention.

Referring to FIG. 1, a system for melting aluminum and recycling black dross 1 according to a preferred embodiment of the present invention includes an aluminum melting furnace 2 responsible for melting aluminum scraps in flux-treated molten aluminum; and a black dross recycling device 3 responsible for recycling black dross formed when inclusions contained in the molten aluminum are entrapped in the flux during melting of the aluminum scraps in the molten aluminum. The system for melting aluminum and recycling black dross 1 is designed to melt aluminum scraps in flux-treated molten aluminum to obtain molten aluminum for producing aluminum casts, and is also designed to treat black dross so that components contained in black dross are recycled.

Hereinafter, for convenience of explanation, the aluminum melting furnace 2 will be described first, and then the black dross recycling device 3 will be described.

Figure 2:
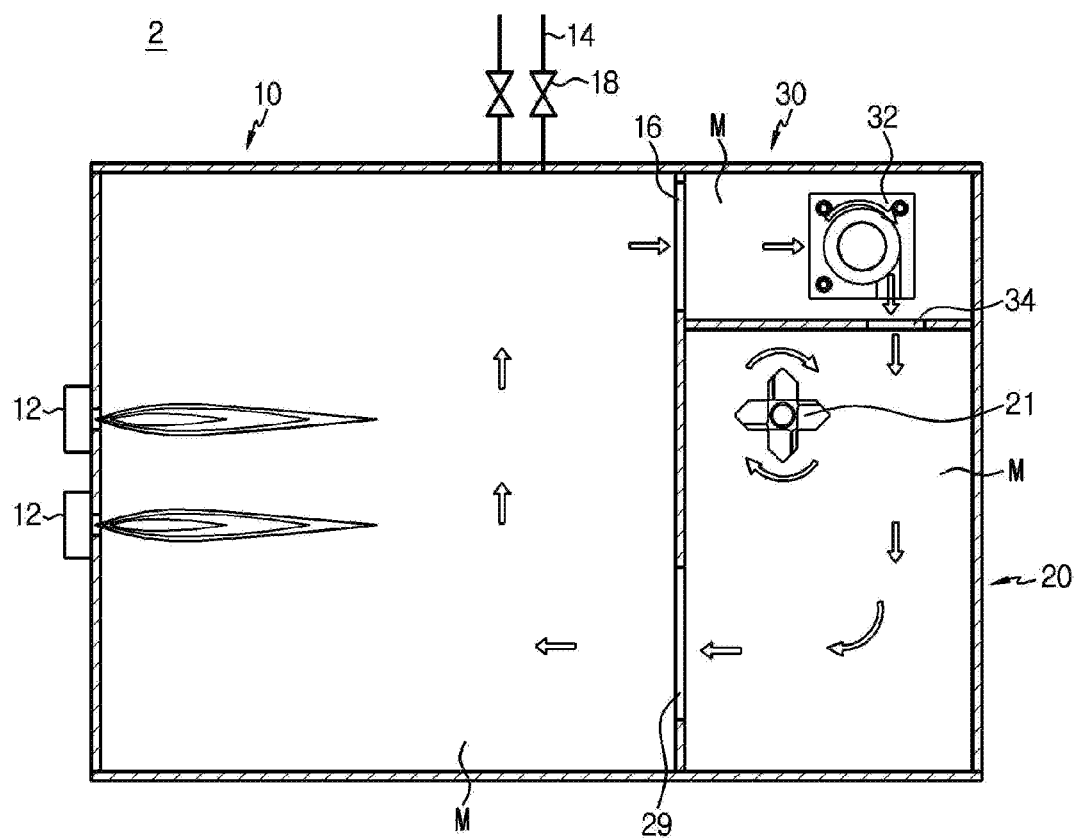
FIG. 2 is a schematic view showing the aluminum melting furnace specified in FIG. 1.

FIG. 2 is a schematic view of the aluminum melting furnace specified in FIG. 1.

Referring to FIG. 2, the aluminum melting furnace 2 includes a heating chamber 10 responsible for heating molten aluminum M, a melting chamber 20, in which aluminum scraps A and a flux F are respectively added to the molten aluminum M, and a flow force applying chamber 30 responsible for applying flow force to the molten aluminum M.

As shown in FIG. 2, the aluminum melting furnace 2 is provided with a plurality of spaces defined by walls made of refractories. The heating chamber 10, the melting chamber 20, and the flow force applying chamber 30 are each disposed in any one of the plurality of spaces of the aluminum melting furnace 2, and are separated from other spaces.

The heating chamber 10 is a space for heating the molten aluminum M to a predetermined temperature.

The heating chamber 10 is connected to a second flow passage 29 of the melting chamber 20 to be described later, so that the molten aluminum M is transferred from the melting chamber 20 to the heating chamber 10. The heating chamber 10 has a sealing structure, in which remaining portions except portions connected to a first flow passage 16 to be described later and the second flow passage 29 are shielded from the outside so that heat loss is minimized.

As shown in FIG. 2, the heating chamber 10 includes heating units 12 responsible for heating the molten aluminum M, tap holes 14 responsible for discharging the molten aluminum M to the outside of the aluminum melting furnace 2, and the first flow passage 16 responsible for transferring the molten aluminum M contained in the heating chamber 10 to the flow force applying chamber 30.

The heating units 12 are apparatuses for heating the molten aluminum M to a predetermined temperature.

As shown in FIG. 2, the heating units 12 may be burners installed in walls that partition the heating chamber 10. Temperature to which the molten aluminum M is heated is not particularly limited. The temperature of the molten aluminum M may be measured by a temperature sensor (not shown) provided in the heating chamber 10. Information on the temperature of the molten aluminum M is transmitted from the temperature sensor to the heating units 12, and based on this information, the heating units 12 may heat the molten aluminum M to a predetermined heating temperature.

The tap holes 14 are outlets for discharging the molten aluminum M heated in the heating chamber 10 to the outside of the aluminum melting furnace 2.

The tap holes 14 may be connected to an aluminum casting device for producing aluminum casts or to a molten metal transfer vessel for transferring the molten aluminum M. Opening/closing valves 18 for selectively opening and closing the tap holes 14 may be installed in the tap holes 14.

The first flow passage 16 is a passage, through which the molten aluminum M contained in the heating chamber 10 is transferred to the flow force applying chamber 30.

As shown in FIG. 2, the first flow passage 16 is formed so as to pass through a wall partitioning the heating chamber 10 and the flow force applying chamber 30. The molten aluminum M is introduced into the flow force applying chamber 30 through the first flow passage 16.

Figure 3:
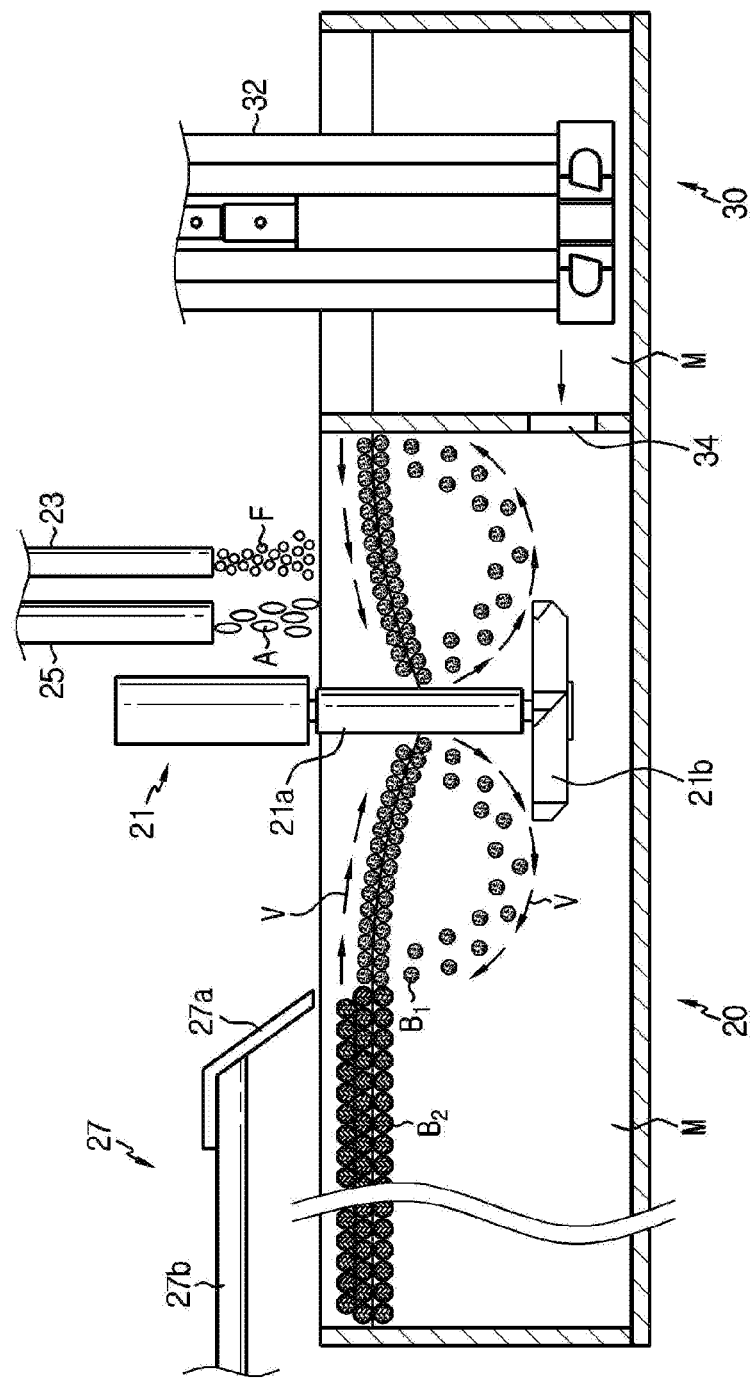
FIG. 3 is a cross-sectional view of the melting chamber and the flow force applying chamber, which are shown in FIG. 2.
Figure 4:
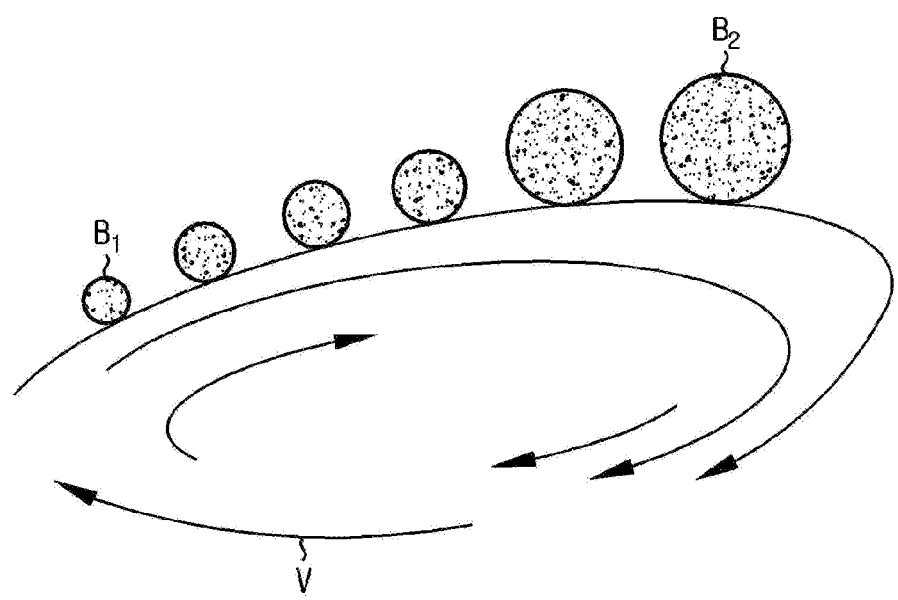
FIG. 4 is a schematic view showing a process, in which spherical black dross is formed in the melting chamber shown in FIG. 2.
Figure 5:
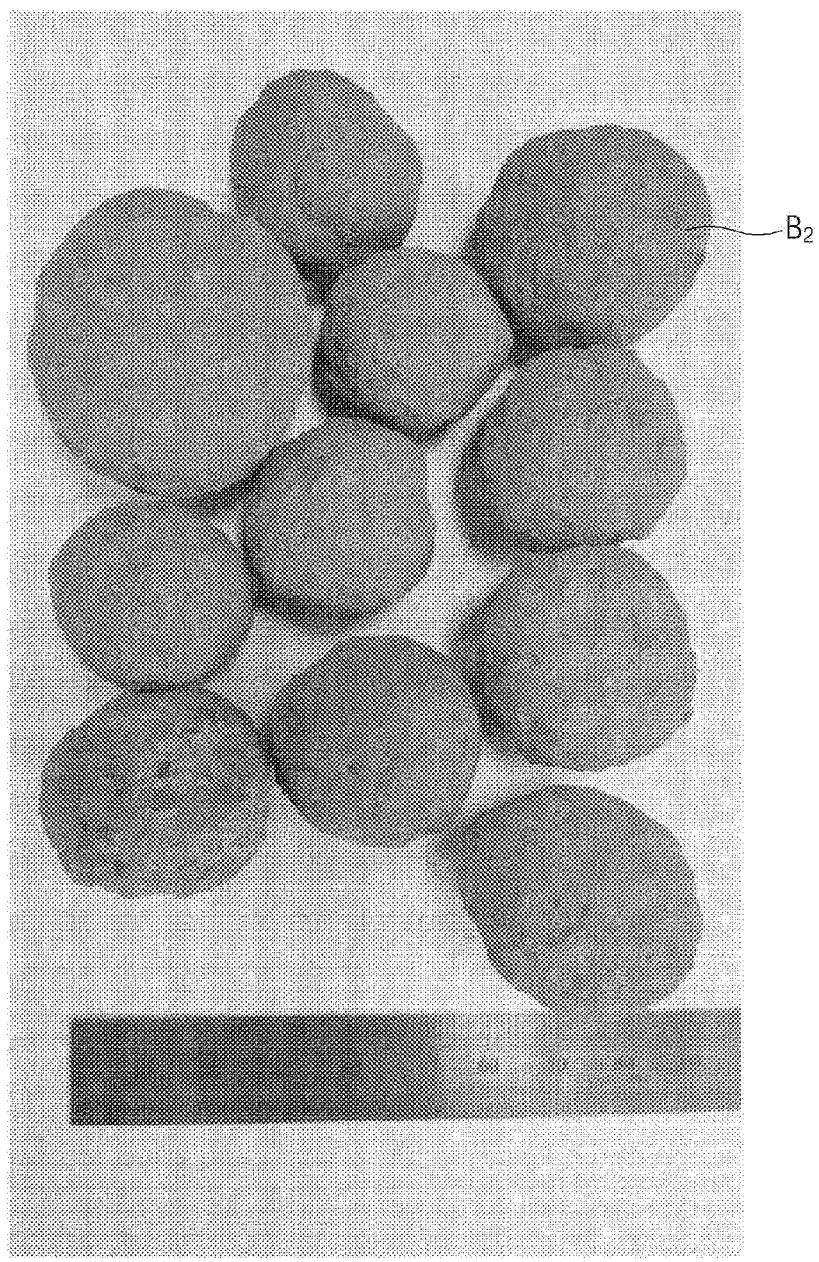
FIG. 5 is an image of spherical black dross formed in the melting chamber shown in FIG. 2.

FIG. 3 is a cross-sectional view of the melting chamber and the flow force applying chamber, which are shown in FIG. 2, FIG. 4 shows a process, in which spherical black dross is formed in the melting chamber shown in FIG. 2, and FIG. 5 is an image of spherical black dross formed in the melting chamber shown in FIG. 2.

The melting chamber 20 is a space, in which the flux F and the aluminum scraps A are added to the molten aluminum M.

The melting chamber 20 is connected to a third flow passage 34 of the flow force applying chamber 30 to be described later, so that the molten aluminum M is transferred from the flow force applying chamber 30 to the melting chamber 20. The melting chamber 20 is configured to have a structure in which at least a part of the upper surface of the melting chamber 20 is opened so as to allow the flux F and the aluminum scraps A to be added to the molten aluminum M. The melting chamber 20 has a relatively smaller volume than the heating chamber 10. That is, the melting chamber 20 has an open structure in which the aluminum scraps A are added to the melting chamber 20 to perform melting operation, and has a volume smaller than that of the heating chamber 10 so as to reduce heat loss.

As shown in FIGS. 2 and 3, the melting chamber 20 includes an eddy unit 21 responsible for generating an eddy V descending in a spiral in the molten aluminum M, a flux supply unit 23 responsible for adding the flux F to the eddy V, a raw material supply unit 25 responsible for adding the aluminum scraps A to the eddy V, and the second flow passage 29 responsible for transferring the molten aluminum M contained in the melting chamber 20 to the heating chamber 10.

The eddy unit 21 is a member for generating the eddy V descending in a spiral in the molten aluminum M contained in the melting chamber 20.

The eddy unit 21 is installed in the melting chamber 20 so that at least a portion of the eddy unit 21 is immersed in the molten aluminum M. When the eddy V generated by the eddy unit 21 and the flow of the molten aluminum M introduced into the melting chamber 20 through the third flow passage 34 directly face each other, the flow of the molten aluminum M may be disturbed. To prevent this, as shown in FIG. 2, the eddy unit 21 is preferably installed at one side of the melting chamber 20 so as not to be positioned in a straight line with the third flow passage 34, without being limited thereto.

As shown in FIG. 3, the eddy unit 21 includes a rotating shaft 21a that has a lower end immersed in the molten aluminum M and an upper end extending to the outside of the molten aluminum M to be axially coupled to a driving motor (not shown), and a stirring impeller 21b axially coupled to the lower end of the rotating shaft 21a. When the driving motor is driven, as shown in FIG. 3, the stirring impeller 21b is rotated about the rotating shaft 21a, and as a result, the eddy V descending in a spiral around the rotating shaft 21a is generated in the molten aluminum M contained in the melting chamber 20.

The flux supply unit 23 is an apparatus for adding the flux F supplied from an external flux source (not shown) to the molten aluminum M contained in the melting chamber 20.

The flux F is a mixed salt having a lower specific gravity than aluminum, and is a material having a high affinity with inclusions. As shown in FIG. 3, the flux supply unit 23 adds the flux F to the eddy V generated by the eddy unit 21. Then, the flux F is swiftly immersed and melted in the molten aluminum M by the eddy V, and then evenly spreads in the melting chamber 20. However, the present invention is not limited to this manner, and the flux supply unit 23 may add the flux F to a portion other the eddy V.

The add time of the flux F is not particularly limited. For example, the flux supply unit 23 may add the flux F to the eddy V before the raw material supply unit 25 adds the aluminum scraps A to the eddy V. Then, the flux F is immersed and melted in the molten aluminum M while swirling downward by the eddy V. At this time, since the flux F has a lower specific gravity than aluminum, the flux F melted in the molten aluminum M floats on the surface of the molten aluminum M to form a molten flux layer, i.e., molten salt layer, on the surface of the molten aluminum M. Such a molten flux layer may prevent the molten aluminum M and the aluminum scraps A added to the molten aluminum M from contacting oxygen in the atmosphere, thereby reducing the amount of aluminum oxide generated.

The flux F has a composition capable of selectively capturing inclusions and forming a molten flux layer. Preferably, the flux F may contain 93 to 97 parts by weight of a mixture in which sodium chloride (NaCl) and potassium chloride (KCl) are mixed in equal parts by weight and 3 to 7 parts by weight of a cryolite (potassium cryolite). More preferably, the flux F may contain 47.5 parts by weight of sodium chloride (NaCl), 47.5 parts by weight of potassium chloride (KCl), and 5 parts by weight of potassium aluminum fluoride ($KAlF_4$).

Meanwhile, when add of the aluminum scraps A is started by the raw material supply unit 25 to be described later, the flux supply unit 23 may inject the flux F into the eddy V at the same time as operation of the raw material supply unit 25 or at another time. That is, even after add of the aluminum scraps A is started, the flux F may be supplied continuously or intermittently in accordance with supply amount of the aluminum scraps A.

The flux F is preferably supplied in an amount equal to the amount of inclusions to be trapped, without being limited thereto. Therefore, the supply amount of the flux F may be adjusted depending on the supply amount of the aluminum scraps A and the kinds of the aluminum scraps A. That is, when the aluminum scraps A containing a large amount of paint or other inclusions is supplied, the supply amount of the flux F may be increased. On the other hand, when the aluminum scraps A having high purity are supplied, the supply amount of the flux F may be decreased.

The raw material supply unit 25 is an apparatus for adding the aluminum scraps A supplied from an external raw material source (not shown) to the molten aluminum M contained in the melting chamber 20.

As shown in FIG. 3, the raw material supply unit 25 is responsible for adding the aluminum scraps A to the eddy V generated by the eddy unit 21. Then, the aluminum scraps A may be quickly immersed and melted in the molten aluminum M while swirling downward by the eddy V. Accordingly, contact between the aluminum scraps A immersed in the molten aluminum M and the atmosphere may be more effectively blocked, so that the amount of aluminum oxide generated may be further reduced.

The add time of the aluminum scraps A is not particularly limited. For example, after a molten flux layer is formed on the surface of the molten aluminum M, add of the aluminum scraps A from the raw material supply unit 25 may be started. Then, the aluminum scraps A may be immersed in the molten aluminum M in a state wherein a molten flux layer is formed on the surface of the molten aluminum M. Accordingly, contact between the aluminum scraps A immersed in the molten aluminum M and the atmosphere may be more effectively blocked, so that the amount of aluminum oxide generated may be further reduced.

When the diameter of the aluminum scraps A is large, heat transmission rate may be lowered. Therefore, it is preferable to use the aluminum scraps A having a diameter of 5 cm or less. The kind of the aluminum scraps A is not particularly limited. For example, the aluminum scraps A may be aluminum used beverage cans scraps (UBCs, A 3XXX series, and A 5XXXX series) mainly containing aluminum, magnesium, and aluminum alloys. The chemical composition of such aluminum used beverage cans scraps is shown in Table 1 below.

TABLE 1

| Part | Al alloy series | Chemical composition (%) | | | | | |
|---|---|---|---|---|---|---|---|
| | | Si | Fe | Cu | Mn | Zn | Mg |
| Body | A 3004 | <0.3 | <0.70 | <0.25 | 1.0-1.5 | <0.25 | 0.8-1.3 |
| Lid | A 5052 | <0.25 | <0.40 | <0.10 | <0.10 | <0.10 | 2.2-2.8 |
| Tab | A 5182 | <0.2 | <0.35 | <0.15 | 0.2-0.5 | <0.25 | 4.0-5.0 |

In addition, inclusions included in the aluminum scraps A have properties of aggregating with molten aluminum when the aluminum scraps A are charged into the molten aluminum M and melted. A molten flux layer, i.e., the flux F, weakens the cohesive force between inclusions and molten aluminum to dissociate the inclusions and the molten aluminum, and selectively captures the inclusions dissociated from the molten aluminum to form black dross $B_1$. The black dross $B_1$ has a specific gravity lower than that of the molten aluminum due to increase in volume during the above-described dross formation process, thereby floating on the surface of the molten aluminum M.

In addition, as shown in FIGS. 3 and 4, the black dross $B_1$ is swirled down by the eddy V and then is separated from the eddy V when the black dross $B_1$ reaches the lower end of the eddy V. Then, after the black dross $B_1$ is floated on the surface of the molten aluminum M, the black dross $B_1$ is then joined to the eddy V by the suction force of the eddy V again. Through this process, the black dross $B_1$ is combined with the other black dross B1 generated on the surface of the molten aluminum M. When this process is repeated, as shown in FIG. 5, a plurality of the black dross $B_1$ are collected into a spherical shape to form a spherical black dross $B_2$. That is, the black dross $B_1$ is repeatedly descended and floated by the eddy V generated in the eddy unit 21, so that a plurality of the black dross $B_1$ are collected into a spherical shape to form the spherical black dross $B_2$. The chemical composition of the spherical black dross $B_2$ is not particularly limited. For example, as described above, when the aluminum scraps A are aluminum used beverage cans scraps (UBCs scrap), and the flux F includes 47.5 parts by weight of sodium chloride (NaCl), 47.5 parts by weight of potassium chloride (KCl), and 5 parts by weight of potassium aluminum fluoride ($KAlF_4$), the chemical composition of the spherical black dross $B_2$ is shown in Table 2.

TABLE 2

| Chemical substances | Chemical composition (%) |
|---|---|
| Al | 5-10 |
| $Al_2O_3$ | 25-35 |
| Mg | 5-10 |
| MgO | 5-10 |
| NaCl | 20-30 |
| KCl | 20-30 |

Since the spherical black dross $B_2$ is gradually formed as the black dross $B_1$ is repeatedly descended and floated in the molten aluminum M, compared with a typical back dross, which is formed without this repetitive descent and floating process, the spherical black dross $B_2$ has excellent capability of removing inclusions. Therefore, in the case of forming the spherical black dross $B_2$, aluminum content in dross may be further reduced as compared with the case of forming typical black dross. For example, typical black dross formed by treating white dross with a flux in a typical process of melting aluminum used beverage cans has an aluminum content of about 50% or more, whereas the spherical black dross $B_2$ has an aluminum content of about 10% or less. Therefore, by forming the spherical black dross $B_2$, the recovery rate of melted pure aluminum may be improved. In addition, by forming the spherical black dross $B_2$, it is possible to omit a dross squeezing process, in which dross is squeezed using an exothermic flux and an indenter to recover aluminum captured in dross, thereby reducing cost of squeezing dross.

The second flow passage 29 is a passage for transferring the molten aluminum M, in which the aluminum scraps A are melted, to the heating chamber 10.

As shown in FIG. 2, the second flow passage 29 is formed so as to pass through a wall partitioning the melting chamber 20 and the heating chamber 10. The molten aluminum M is introduced into the heating chamber 10 through the second flow passage 29.

The flow force applying chamber 30 is a space for applying flow force to the molten aluminum M so that the molten aluminum M circulates between the heating chamber 10 and the melting chamber 20.

The flow force applying chamber 30 is connected to the first flow passage 16 of the heating chamber 10 so that the molten aluminum M is transferred from the heating chamber 10 to the flow force applying chamber 30.

As shown in FIG. 2, the flow force applying chamber 30 is preferably provided between the first flow passage 16 of the heating chamber 10 and the melting chamber 20. However, the present invention is not limited to such a configuration, and the flow force applying chamber 30 may be provided between the second flow passage 29 of the melting chamber 20 and the heating chamber 10.

As shown in FIGS. 2 and 3, the flow force applying chamber 30 includes an acceleration unit 32 responsible for providing flow force to the molten aluminum M by accelerating the molten aluminum M and the third flow passage 34 responsible for transferring the flow force-provided molten aluminum M to the melting chamber 20.

The acceleration unit 32 is installed in the flow force applying chamber 30 so that at least a portion of the acceleration unit 32 is immersed in the molten aluminum M. As shown in FIG. 3, the acceleration unit 32 may be, for example, a molten metal pump capable of circulating the molten aluminum M contained in the flow force applying chamber 30 by receiving driving force from a driving motor (not shown) disposed outside the flow force applying chamber 30.

The third flow passage 34 is a passage for transferring the molten aluminum M, to which flow force is provided by the acceleration unit 32, to the flow force applying chamber 30.

As shown in FIGS. 2 and 3, the third flow passage 34 is formed so as to pass through the lower part of a wall partitioning the flow force applying chamber 30 and the melting chamber 20 so that the third flow passage 34 faces the impeller of the acceleration unit 32. The molten aluminum M is introduced into the melting chamber 20 through the third flow passage 34.

In the present specification, the flow force applying chamber 30 provided with the acceleration unit 32 is disposed between the heating chamber 10 and the melting chamber 20. However, the present invention is not limited to this arrangement. That is, the eddy unit 21 of the melting chamber 20 forms the eddy V to apply flow force to the molten aluminum M so that the molten aluminum M circulates in the aluminum melting furnace 2 as the molten aluminum M moves up and down. Accordingly, the flow force applying chamber 30 and the acceleration unit 32 provided thereon may be omitted.

Figure 6:
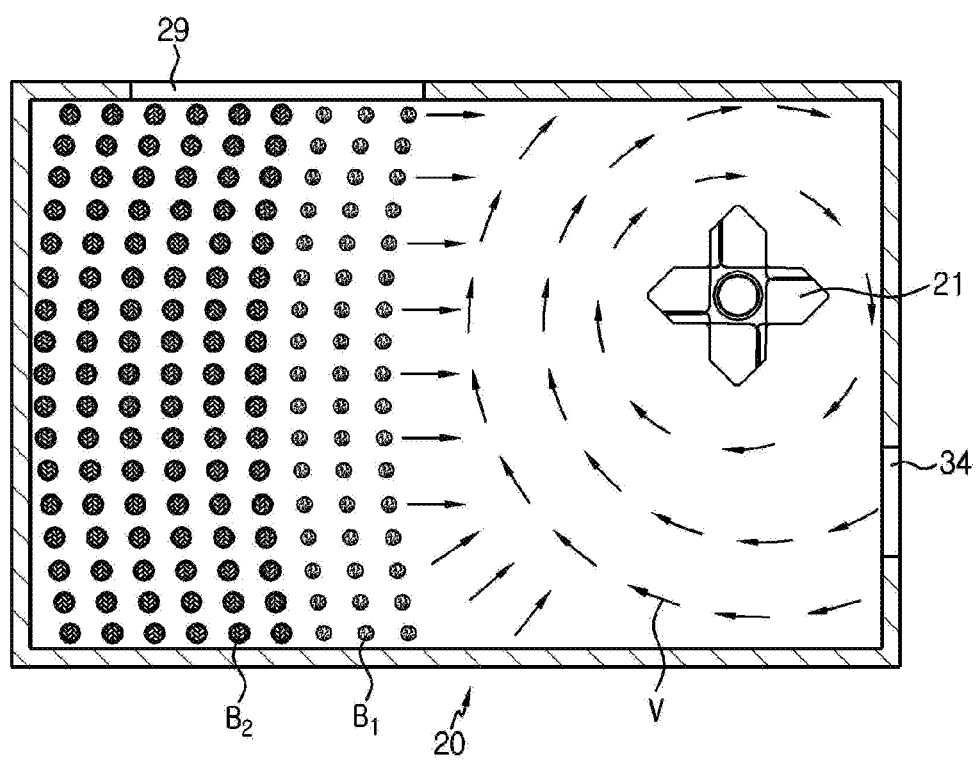
FIG. 6 is a top view of the melting chamber shown in FIG. 2 and shows a state wherein spherical black dross is floating on the surface of molten aluminum contained in the melting chamber.

FIG. 6 is shows a state wherein spherical black dross is floating on the surface of molten aluminum contained in the melting chamber shown in FIG. 2.

When a large number of the spherical black dross $B_2$ is densely packed in the eddy V, the descending and floating action of the spherical black dross $B_2$ due to the eddy V is weakened, which may reduce the formation efficiency of the spherical black dross $B_2$. Therefore, the spherical black dross $B_2$ grown to a predetermined reference diameter is preferably separated from the eddy V to adjust the density of the spherical black dross $B_2$ located in the eddy V to an appropriate level.

The reference diameter of the spherical black dross $B_2$ is not particularly limited. For example, when the aluminum scraps A are aluminum used beverage cans scraps (UBCs scrap), and the flux F includes 47.5 parts by weight of sodium chloride (NaCl), 47.5 parts by weight of potassium chloride (KCl), and 5 parts by weight of potassium aluminum fluoride ($KAlF_4$), the spherical black dross $B_2$ has a reference diameter of 2 to 5 cm.

As such, to separate the spherical black dross $B_2$ grown to the reference diameter from the eddy V, the melting chamber 20 may further include a separation unit 27 that separates the spherical black dross $B_2$ from the eddy V.

As shown in FIG. 3, the separation unit 27 includes a separation plate 27a having a shape capable of pulling the spherical black dross $B_2$ floated on the surface of the molten aluminum M away from the eddy V and a connecting rod 27b responsible for connecting a driving device (not shown) and the separation plate 27a. In this case, the driving device is preferably a work vehicle provided outside the melting chamber 20, without being limited thereto.

When the separation unit 27 is provided as described above, the spherical black dross $B_2$ having a predetermined reference diameter may be pulled away from the eddy V using the separation plate 27a to be separated from the eddy V. Therefore, decrease in formation efficiency of the spherical black dross $B_2$, which may be caused due to densification of the spherical black dross $B_2$, may be prevented. At this time, the separation unit 27 may also function to lade the spherical black dross $B_2$ from the molten aluminum M and to discharge the spherical black dross $B_2$ to the outside.

In addition, when the spherical black dross $B_2$ is pulled away from the eddy V by the separation unit 27, as shown in FIG. 6, the surface of the molten aluminum M contained in the melting chamber 20 is covered with the spherical black dross $B_2$ separated from the eddy V. Therefore, the molten aluminum M contained in the melting chamber 20 is cut off from the atmosphere by the spherical black dross $B_2$ covering the molten aluminum M, and the spherical black dross $B_2$ has an effect of keeping the molten aluminum M contained in the melting chamber 20 warm. Therefore, since heat loss of the molten aluminum M is minimized by the spherical black dross $B_2$, the temperature of the molten aluminum M is higher than that of molten aluminum not covered by spherical black dross.

In the case of a conventional aluminum melting furnace, the temperature of molten aluminum contained in a melting chamber is generally 700° C. or less. On the other hand, in the case of the aluminum melting furnace 2, the temperature of the molten aluminum M contained in the melting chamber 20 may be 730° C. or higher. Therefore, compared with a conventional aluminum melting furnace, the aluminum melting furnace 2 may further improve the melting efficiency of the aluminum scraps A.

Figure 7:
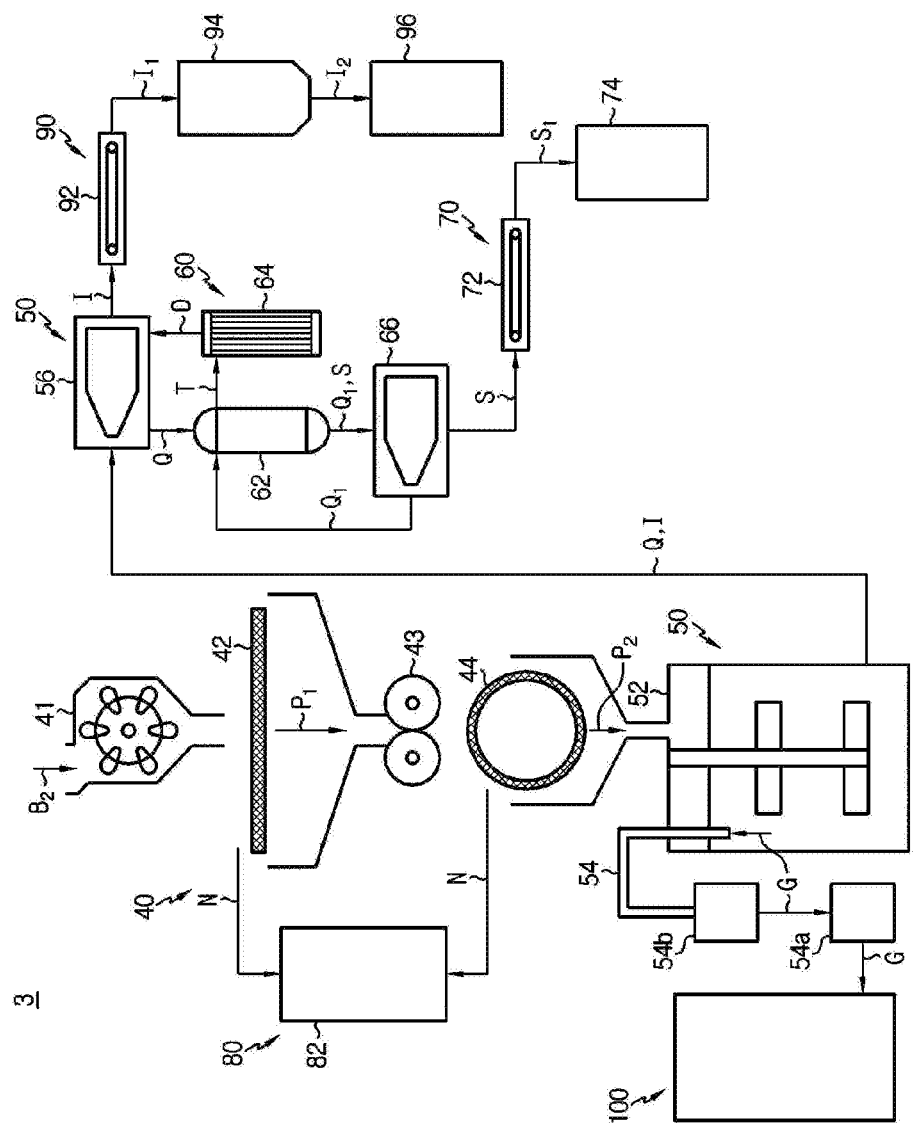
FIG. 7 is a schematic view showing the black dross recycling device specified in FIG. 1.

FIG. 7 is a schematic view showing the black dross recycling device specified in FIG. 1.

When the aluminum scraps A are melted using the above-described aluminum melting furnace 2, the black dross $B_1$ is collected into a spherical shape to form the spherical black dross $B_2$. The spherical black dross $B_2$ has a relatively low content of aluminum as compared with a typical black dross, but contains a predetermined amount of compositions having economic value, such as aluminum oxide and the flux F, as well as aluminum. Therefore, when the spherical black dross $B_2$ is discharged through a landfill method without a squeezing process, compositions contained in the spherical black dross $B_2$ are not be recycled, resulting in poor economic efficiency and environmental pollution due to the spherical black dross $B_2$.

To solve these problems, the system for melting aluminum and recycling black dross 1 includes the black dross recycling device 3 responsible for processing the spherical black dross $B_2$ so that compositions contained in the spherical black dross $B_2$ may be recycled.

As shown in FIG. 7, the black dross recycling device 3 may include a crushing/pulverizing unit 40 responsible for crushing and pulverizing the spherical black dross $B_2$ to split the spherical black dross $B_2$ into aluminum granules N and dross particulate powder $P_2$; a water decomposition unit 50 in which the dross particulate powder $P_2$ is reacted with water to decompose into soluble solids S, insoluble solids I, and hydrolysis gas G; a precipitation unit 60 responsible for distilling an aqueous solution Q in which the soluble solids S are dissolved so that the soluble solids S are precipitated; a soluble solids storage unit 70 responsible for drying and storing the soluble solids S; an aluminum granule storage unit 80 responsible for storing the aluminum granules N; an insoluble solids storage unit 90 for drying, burning, and storing the insoluble solids I; and a gas storage unit 100 responsible for storing the hydrolysis gas G.

First, the crushing/pulverizing unit 40 is an apparatus for crushing and pulverizing the spherical black dross $B_2$.

The crushing/pulverizing unit 40 may include a crusher 41 responsible for crushing the spherical black dross $B_2$, a first separating member 42 responsible for separating the aluminum granules N and the dross powder $P_1$ in the crushed products of the spherical black dross $B_2$, a pulverizer 43 responsible for pulverizing the dross powder $P_1$, and a second separating member 44 responsible for separating the aluminum granules N and the dross particulate powder $P_2$ pulverized by the pulverizer 43 in the pulverized products of the dross powder P1.

The crusher 41 is an apparatus for crushing the spherical black dross $B_2$ and splitting the spherical black dross $B_2$ into the aluminum granules N and the dross powder $P_1$.

Aluminum particles and aluminum alloy particles having relatively large particle diameters among aluminum particles and aluminum alloy particles contained in the spherical black dross $B_2$ are agglomerated into aluminum granules and aluminum alloy granules, respectively, due to heat generated when the spherical black dross $B_2$ is crushed. In addition, aluminum particles and aluminum alloy particles having relatively small particle diameters among aluminum particles and aluminum alloy particles contained in the spherical black dross $B_2$ are not agglomerated and become aluminum powder and aluminum alloy powder, respectively. For convenience of explanation, hereinafter, the aluminum granules N and the aluminum alloy granules will be collectively referred as the aluminum granules N.

Using the characteristics of aluminum particles, the crusher 41 crushes the spherical black dross $B_2$ supplied from the aluminum melting furnace 2 and splits the spherical black dross $B_2$ into the aluminum granules N and the dross powder $P_1$. The dross powder $P_1$ is a powder form of compositions other than aluminum particles having a relatively large particle diameter among the compositions of the spherical black dross $B_2$.

The first separating member 42 is a member for separating the aluminum granules N and the dross powder $P_1$ from each other in the crushed products of the spherical black dross $B_2$.

The structure of the first separating member 42 is not particularly limited. For example, the first separating member 42 may be composed of a vibrating screen having a predetermined first reference particle diameter. The first reference particle diameter is preferably about 10 mm, without being limited thereto.

The first separating member 42 separates the aluminum granules N and the dross powder $P_1$, and then transfers the aluminum granules N to an aluminum storage unit 80 and transfers the dross powder $P_1$ to the pulverizer 43.

The pulverizer 43 is an apparatus for pulverizing the dross powder $P_1$ to split the dross powder $P_1$ into the aluminum granules N and the dross particulate powder $P_2$.

Among compositions contained in the dross powder $P_1$, the insoluble solids I, such as aluminum oxide and magnesium oxide, are preferably made into fine particles for easy recycling. Accordingly, the pulverizer 43 for pulverizing the dross powder $P_1$ and making the dross powder $P_1$ into fine particles is provided.

When the dross powder $P_1$ is pulverized using the pulverizer 43, a part of aluminum particles contained in the dross powder $P_1$ may be agglomerated to form the aluminum granules N. Accordingly, the pulverizer 43 pulverizes the dross powder $P_1$ transferred from the first separating member 42 and splits the dross powder $P_1$ into the aluminum granules N and the pulverized dross particulate powder $P_2$.

The second separating member 44 is a member for separating the aluminum granules N and the dross particulate powder $P_2$ from each other in the pulverized products of the dross powder $P_1$.

The structure of the second separating member 44 is not particularly limited. For example, the second separating member 44 may be a trommel screen having a predetermined second reference particle diameter. The reference particle diameter is preferably 0.5 mm, without being limited thereto.

The second separating member 44 separates the aluminum granules N and the dross particulate powder $P_2$ transferred from the pulverizer 43, and then transfers the aluminum granules N to the aluminum granule storage unit 80 and transfers the dross particulate powder $P_2$ to the water decomposition unit 50.

Figure 8:
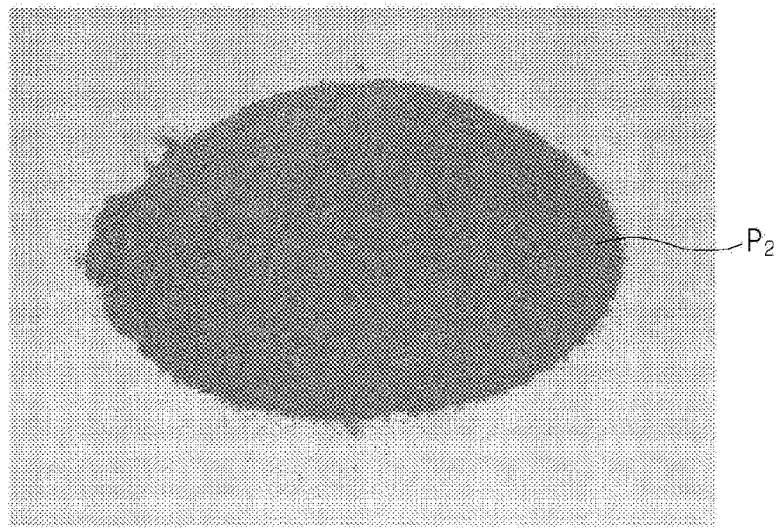
FIG. 8 is an image of powder obtained by pulverizing dross.

FIG. 8 is an image of dross particulate powder.

The water decomposition unit 50 is an apparatus for decomposing the dross particulate powder $P_2$ transferred from the second separating member 44 with water.

As shown in FIG. 8, the dross particulate powder $P_2$ contains compositions having various physicochemical properties, such as salt fluxes, aluminum, aluminum-magnesium alloys, magnesium, and oxides, and is present in the form of dark gray powder.

To recycle compositions contained in the dross particulate powder $P_2$, the compositions contained in the dross particulate powder $P_2$ are preferably converted and decomposed for easy recycling. Therefore, the water decomposition unit 50 capable of decomposing the dross particulate powder $P_2$ with water is provided for this purpose.

The water decomposition unit 50 may include a reactor 52 responsible for stirring the dross particulate powder $P_2$ with water for facilitating a decomposition reaction with water, in which the dross particulate powder $P_2$ is decomposed into the soluble solids S, the insoluble solids I, and the hydrolysis gas G; a gas collector 54 responsible for collecting the hydrolysis gas G; and a first centrifugal separator 56 responsible for centrifugally separating the aqueous solution Q and the insoluble solids I.

The reactor 52 is an apparatus for stirring the dross particulate powder $P_2$ and water to promote hydrolysis of the dross particulate powder $P_2$.

The reactor 52 may be a conventional reactor capable of stirring gas, liquid, and solid materials. In the reactor 52, the dross particulate powder $P_2$ mixed with water at a predetermined mixing ratio is stirred, so that the dross particulate powder $P_2$ is decomposed with water. The mixing ratio of the dross particulate powder $P_2$ to water is preferably 1:2, without being limited thereto.

Hereinafter, physicochemical phenomena occurring when the dross particulate powder $P_2$ is stirred with water will be described according to the properties of compositions contained in the dross particulate powder $P_2$.

First, among compositions contained in the dross particulate powder $P_2$, the water-soluble solids S are dissolved in water. At this time, the aqueous solution Q containing the soluble solids S as a solute and containing water as a solvent is produced. The soluble solids S mainly include chloride salts contained in the flux F, such as sodium chloride (NaCl) and potassium chloride (KCl). When the mixing ratio of the dross particulate powder $P_2$ to water is 1:2, the concentration of chloride salts in the aqueous solution Q is about 20%.

Next, among compositions contained in the dross particulate powder $P_2$, the water-insoluble solids I are dispersed or precipitated in the aqueous solution Q. The insoluble solids I mainly include aluminum, aluminum-magnesium alloys, magnesium, aluminum oxide ($Al_2O_3$), magnesium oxide (MgO), and a spinel oxide ($MgAl_2O_4$).

Next, among compositions contained in the dross particulate powder $P_2$, reactants with properties that are hydrolyzed in the presence of water are hydrolyzed by water. As a result of this hydrolysis reaction, hydrolysis solids, the hydrolysis gas G, and reaction heat are generated. The reactants mainly include metals and metal compounds contained in the spherical black dross $B_2$, such as aluminum (Al), magnesium (Mg), and aluminum carbide ($Al_4C_3$). Here, aluminum carbide ($Al_4C_3$) is not a first composition present in waste aluminum cans, and is a by-product generated in a process of manufacturing aluminum used beverage cans scraps by processing waste aluminum cans.

As shown in Reaction equations 1 to 3, when reactants are hydrolyzed in the presence of water, as a result of hydrolysis of aluminum, aluminum oxide and hydrogen are generated; as a result of hydrolysis of magnesium, magnesium oxide and hydrogen are generated; and as a result of hydrolysis of aluminum carbide, aluminum oxide and methane are generated. In particular, when aluminum or an aluminum alloy is brought into contact with water, hydrolysis reaction is vigorous and the temperature of water rises to 90° C. or higher, so that the above-mentioned hydrolysis reaction may be further promoted by such temperature increase.

<Reaction equation 1>

$$2Al + 3H_2O \rightarrow Al_2O_3 + 3H_2 + Heat \quad (1)$$

<Reaction equation 2>

$$Mg + H_2O \rightarrow MgO + H_2 + Heat \quad (2)$$

<Reaction equation 3>

$$Al_4C_3 + 6H_2O \rightarrow 2Al_2O_3 + 3CH_4 + Heat \quad (3)$$

Since the hydrolysis solids generated by this hydrolysis reaction mainly include insoluble solids, such as aluminum oxide, magnesium oxide, aluminum oxide alloys, and carbon components, the hydrolysis solids are dispersed or precipitated in the aqueous solution Q. Therefore, the insoluble solids I already contained in the spherical black dross $B_2$ and insoluble solids generated by hydrolysis are dispersed or precipitated in the aqueous solution Q. For convenience of explanation, hereinafter, the insoluble solids I already contained in the spherical black dross $B_2$ and the insoluble solids generated by hydrolysis are collectively referred to as the insoluble solids I.

In addition to aluminum, magnesium, and aluminum carbide described above, a small amount of reactants contained in the dross particulate powder $P_2$ is hydrolyzed to generate the various types of hydrolysis gas G. The composition ratio of the hydrolysis gas G is shown in Table 3 below.

TABLE 3

| Classification | Gas components (%) | | | | | | |
|---|---|---|---|---|---|---|---|
| | Hydrogen | Methane | Ethane | Ethene | Propane | Propene | Hydrogen sulfide |
| Early collection (Large amount) | 48.14 | 51.55 | 0.020 | 0.009 | 0.009 | 0.012 | 0.0047 |
| Late collection (Small amount) | 92.13 | 7.58 | 0.003 | 0.001 | 0.001 | 0.001 | 0.0020 |

As shown in Table 3, the hydrolysis gas G mainly contains methane gas ($CH_4$) and hydrogen gas ($H_2$). Methane gas and hydrogen gas account for about 99% of the hydrolysis gas G. In the initial stage of a hydrolysis process, hydrolysis of aluminum, aluminum alloys, and aluminum carbide is mainly proceeded, and hydrogen gas and methane gas are mainly generated. In the late stage of the hydrolysis process, in which a predetermined time has elapsed after start of the hydrolysis process, hydrolysis of aluminum and aluminum alloys is mainly proceeded, and hydrogen gas is mainly generated. Analysis of the components of the hydrolysis gas G is preferably performed using gas chromatography analysis according to ASTM D1945-03, without being limited thereto.

In addition, a method of measuring the amount of the hydrolysis gas G is not particularly limited. For example, the amount of the hydrolysis gas G generated may be measured by the following method. First, the spherical black dross $B_2$ having a diameter of 2 to 5 cm is crushed and pulverized. Next, pulverized products passed through a 0.5 cm (500 μm) hole in the spherical black dross $B_2$ are obtained as a reaction sample. Then, 100 g of the reaction sample and 1 L of distilled water are added to a sealed glass flask having a capacity of 2 L. Next, the reaction sample and distilled water are stirred at 100 to 200 rpm using a reactor installed in the glass flask, and the reaction sample is decomposed with distilled water. Subsequently, the hydrolysis gas G generated by decomposing the reaction sample with distilled water is collected from distilled water in a graduated cylinder using a water substitution method. When 100 g of the reaction sample is decomposed using this procedure, 8 to 12 L of the hydrolysis gas G may be collected.

The gas collector 54 is an apparatus for collecting the hydrolysis gas G generated in the reactor 52.

The structure of the gas collector 54 is not particularly limited, and may be a conventional gas collector capable of collecting gas from an aqueous solution. The gas collector 54 functions to collect the hydrolysis gas G from the aqueous solution Q contained in the reactor 52 and to transfer the hydrolysis gas G to the gas storage unit 100.

As shown in FIG. 7, to increase the purity of actually recyclable gas in the hydrolysis gas G or to separate specific gas suitable for recycling from other gases in the hydrolysis gas G, the gas collector 54 may be provided with a gas separation and purification unit 54a capable of separating and purifying gas contained in the hydrolysis gas G. The separation and purification method applied to the gas separation and purification unit 54a is not particularly limited. For example, gas contained in the hydrolysis gas G may be separated and purified in the gas separation and purification unit 54a according to a pressure swing adsorption method. In addition, in the gas separation and purification unit 54a, methane gas separated and purified from the hydrolysis gas G may be reformed through steam methane reforming and converted into hydrogen gas.

In addition, since the hydrolysis gas G is generated by a violent hydrolysis reaction, a very small amount of moisture may be contained therein. To solve these problems, the gas collector 54 may further include at least one of a moisture trap unit 54b, a moisture removal unit (not shown), and a desulfurization unit (not shown). As shown in FIG. 7, the moisture trap unit 54b, the moisture removal unit, and the desulfurization unit are preferably installed upstream of the gas separation and purification unit 54a, without being limited thereto.

The first centrifugal separator 56 is an apparatus for centrifugally separating the aqueous solution Q and the insoluble solids I.

The first centrifugal separator 56 is preferably a B.S.P centrifugal separator, without being limited thereto. The first centrifugal separator 56 may include a first filter having a predetermined third reference particle diameter suitable for separating the aqueous solution Q and the insoluble solids I. The first filter is preferably a nonwoven filter and the third reference particle diameter is preferably 7 to 15 μm, without being limited thereto.

In the first centrifugal separator 56, the aqueous solution Q and the insoluble solids I are separated using the first filter. Then, the aqueous solution Q is transferred to the precipitation unit 60, and the insoluble solids I are transferred to the insoluble solids storage unit 90.

Meanwhile, when the insoluble solids I and the aqueous solution Q are separated in the first centrifugal separator 56, some of the aqueous solution Q may not be separated and adsorbed to the insoluble solids I. However, since the aqueous solution Q includes the soluble solids S, products prepared by recycling the insoluble solids I may be corroded by chlorides contained in the soluble solids S. Further, when drying and burning of the insoluble solids I is performed, sodium oxide ($Na_2O$) and potassium oxide ($K_2O$) are generated from chlorides contained in the soluble solids S. The durability of a product prepared through recycling the insoluble solids I may be deteriorated due to sodium oxide and potassium oxide.

To prevent this, in the first centrifugal separator 56, the insoluble solids I to which the aqueous solution Q is adsorbed may be washed using distilled water so that the concentration of chlorine contained in the insoluble solids I is equal to or lower than a predetermined reference chlorine concentration, and then the insoluble solids I and distilled water used to wash the insoluble solids may be centrifuged. The process of washing the insoluble solids I with distilled water may be repeatedly performed until the concentration of chlorine contained in the insoluble solids I is lower than the reference chlorine concentration. The reference chlorine concentration is preferably 300 ppm, without being limited thereto. In this case, in the first centrifugal separator 56, the insoluble solids I are preferably washed with distilled water D generated by condensing water vapor T evaporated in a vacuum distiller 62 by the condenser 64 of the precipitation unit 60 to be described later, without being limited thereto.

The precipitation unit 60 is an apparatus for distilling the aqueous solution Q so that the soluble solids S are precipitated from the aqueous solution Q.

The precipitation unit 60 may include the vacuum distiller 62 responsible for vacuum-distilling the aqueous solution Q at a predetermined temperature and pressure to precipitate the soluble solids S; the condenser 64 responsible for generating the distilled water D by condensing the water vapor T generated by evaporation of water contained in the aqueous solution Q by the vacuum distiller 62; and a second centrifugal separator 66 responsible for centrifugally separating the soluble solids S precipitated by the vacuum distiller 62 and the aqueous solution Q.

The vacuum distiller 62 is an apparatus for vacuum-distilling the aqueous solution Q at predetermined vacuum distillation temperature and vacuum distillation pressure to precipitate the soluble solids S.

The vacuum distiller 62 may be a conventional vacuum distiller used to precipitate a solute from a water solvent. In the vacuum distiller 62, the vacuum distillation temperature and vacuum distillation pressure are set in consideration of the sensitivity of crystal growth of the soluble solids S. Since the soluble solids S mainly include chloride salts contained in the flux F, such as sodium chloride (NaCl) and potassium chloride (KCl), considering this, the vacuum distillation temperature is preferably set to 40 to 70° C. and the vacuum distillation pressure is preferably set to 12 to 40 kPa, without being limited thereto.

When the aqueous solution Q is vacuum-distilled under the temperature and pressure, the concentration of the soluble solids S increases as water contained in the aqueous solution Q evaporates. Then, when the concentration of the soluble solids S reaches to saturated concentration, the soluble solids S precipitates from the aqueous solution Q and begins to crystallize. The saturated concentration is not particularly limited. For example, when vacuum distillation is performed at a vacuum distillation temperature of about 65° C. and a vacuum distillation pressure of about 27 kPa, the saturated concentration of an aqueous solution $Q_1$ is 27 to 30%.

When the aqueous solution Q is vacuum-distilled, the aqueous solution Q is separated into the water vapor T evaporated by vacuum distillation, the soluble solids S, which are precipitated from the aqueous solution Q and crystallized, and the aqueous solution $Q_1$, in which the non-precipitated soluble solids S are dissolved. In the vacuum distiller 62, the water vapor T is transferred to the condenser 64, and the aqueous solution $Q_1$, in which the precipitated and crystallized soluble solids S are dispersed and precipitated, is transferred to the second centrifugal separator 66.

The condenser 64 is an apparatus for condensing moisture to generate the distilled water D.

The condenser 64 condenses moisture transferred from the vacuum distiller 62 to generated the distilled water D. The distilled water D is preferably transferred from the condenser 64 to the first centrifugal separator 56 so that the insoluble solids I separated from the aqueous solution Q are washed with the distilled water D in the first centrifugal separator 56, without being limited thereto.

The second centrifugal separator 66 is an apparatus for centrifugally separating the soluble solids S and the aqueous solution $Q_1$ transferred from the vacuum distiller 62, respectively.

The second centrifugal separator 66 is preferably a Conturbex centrifuge, without being limited thereto. The second centrifugal separator 66 may include a second filter having a predetermined fourth reference particle diameter so that the soluble solids S and the aqueous solution $Q_1$ are separated from each other. The second filter is preferably a wire mesh filter, and the fourth reference particle diameter is preferably 0.05 to 0.3 mm, without being limited thereto.

In the second centrifugal separator 66, the soluble solids S and the aqueous solution $Q_1$ are centrifugally separated using the second filter, and then the soluble solids S are transferred to the soluble solids storage unit 70 and the aqueous solution $Q_1$ is re-transferred to the vacuum distiller 62.

In the vacuum distiller 62, the aqueous solution $Q_1$ re-transferred from the second centrifugal separator 66 is again subjected to vacuum distillation at a predetermined temperature and pressure. The vacuum distillation and centrifugal separation processes may be repeatedly performed several times.

For this purpose, the plural vacuum distillers 62 having different vacuum distillation temperatures and vacuum distillation pressures may be provided, and, depending on the process sequence, the soluble solids S may be re-precipitated selectively using any one of the vacuum distillers 62.

In this specification, a method of re-precipitating the soluble solids S from the aqueous solution $Q_1$ using the vacuum distiller 62 is described, but the present invention is not limited thereto. For example, the precipitation unit 60 may further include at least one of a sunlight exposing salt field and a forced evaporative salt field to re-precipitate the soluble solids S from the aqueous solution $Q_1$. Each of the sunlight exposing salt field and the forced evaporative salt field may precipitate the soluble solids S from the aqueous solution $Q_1$ transferred from the second centrifugal separator 66 and may transfer the soluble solids S to the soluble solids storage unit 70.

Figure 9:
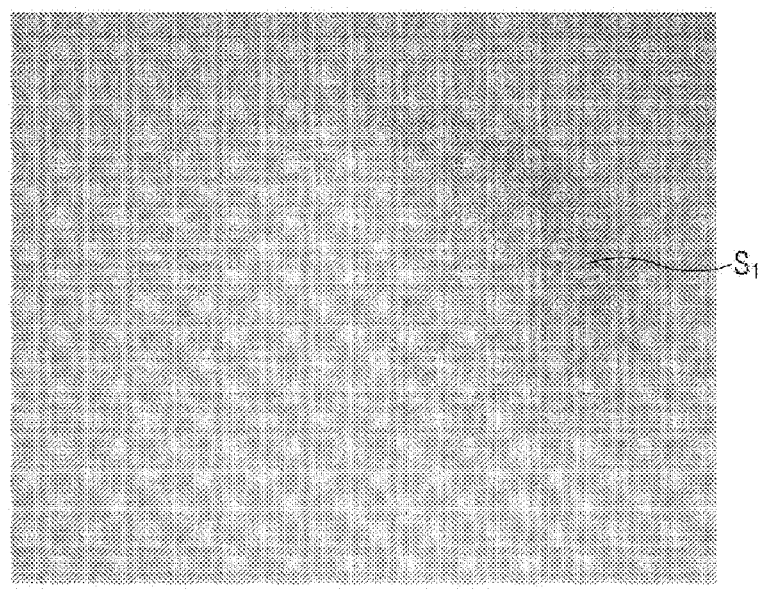
FIG. 9 is an image of precipitated and dried soluble solids.
Figures 10, 11:
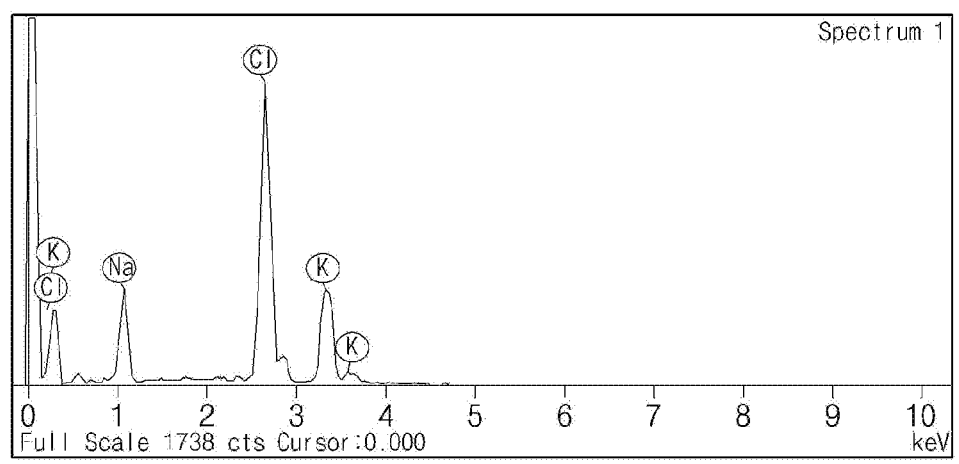
FIG. 10 is an SEM-EDS chart showing results of qualitative analysis of the soluble solids shown in FIG. 9.
FIG. 11 is a graph showing the composition ratio of the soluble solids shown in FIG. 9.

FIG. 9 is an image showing precipitated and dried soluble solids, FIG. 10 is an SEM-EDS chart showing the results of qualitative analysis of the soluble solids shown in FIG. 9, and FIG. 11 is a chart showing the composition ratio of the soluble solids shown in FIG. 9.

Next, the soluble solids storage unit 70 is an apparatus for drying and storing the soluble solids S transferred from the second centrifugal separator 66.

The structure of the soluble solids storage unit 70 is not particularly limited. For example, the soluble solids storage unit 70 may include a soluble solids dryer 72 responsible for drying the soluble solids S, and a soluble solids storage chamber 74 responsible for storing soluble solids $S_1$ dried in the soluble solids dryer 72.

The soluble solids dryer 72 is an apparatus for drying the soluble solids S separated from the aqueous solution $Q_1$ in the second centrifugal separator 66.

The soluble solids S and the aqueous solution $Q_1$ are separated in the second centrifugal separator 66, but some of the aqueous solution $Q_1$ may be adsorbed on the surfaces of the soluble solids S without being separated from the soluble solids S. Therefore, the soluble solids S separated from the aqueous solution $Q_1$ in the second centrifugal separator 66 are present in a slurry state due to the aqueous solution $Q_1$ adsorbed on the surfaces of the soluble solids S. However, when the soluble solids S are present in a slurry state, recycling is not easy. To solve this problem, the soluble solids dryer 72 is provided.

In the soluble solids dryer 72, the soluble solids S discharged from the second centrifugal separator 66 are dried so that the soluble solids S have a moisture content equal to or less than a predetermined reference moisture content. The reference moisture content is preferably about 0.3%, without being limited thereto.

As shown in FIGS. 9 and 10, the dried soluble solids $S_1$ are present in the form of white powder and mainly includes chloride salts, such as NaCl and KCl. In the soluble solids dryer 72, the dried soluble solids $S_1$ are transferred to the soluble solids storage chamber 74.

The soluble solids storage chamber 74 is an apparatus for storing the soluble solids $S_1$, from which moisture is removed in the soluble solids dryer 72.

The soluble solids storage chamber 74 may be a conventional storage chamber capable of storing a storage object. The soluble solids $S_1$, from which moisture are removed in the soluble solids dryer 72, are transferred to the soluble solids storage chamber 74, and are stored isolated from the outside. As shown in FIGS. 10 and 11, the soluble solids $S_1$ stored in the soluble solids storage chamber 74 mainly include chloride salts contained in the flux F, and thus are preferably recycled as the flux F. However, the present invention is not limited thereto, and the soluble solids $S_1$ may be recycled in various fields requiring mixed salts.

Next, the aluminum granule storage unit 80 is an apparatus for storing the aluminum granules N discharged from the crushing/pulverizing unit 40.

The structure of the aluminum granule storage unit 80 is not particularly limited. For example, as shown in FIG. 7, the aluminum granule storage unit 80 may include an aluminum granules storage chamber 82 capable of storing the aluminum granules N, which are separated in and discharged from the first separating member 42 and the second separating member 44.

Next, the insoluble solids storage unit 90 is an apparatus for drying and burning the insoluble solids I transferred from the first centrifugal separator 56 and storing the same.

The structure of the insoluble solids storage unit 90 is not particularly limited. For example, the insoluble solids storage unit 90 may include an insoluble solids dryer 92 responsible for drying the insoluble solids I, an insoluble solids burning furnace 94 responsible for burning insoluble solids $I_1$ dried in the insoluble solids dryer 92, and an insoluble solids storage chamber 96 responsible for storing insoluble solids 12 burned in the insoluble solids burning furnace 94.

Figure 12:
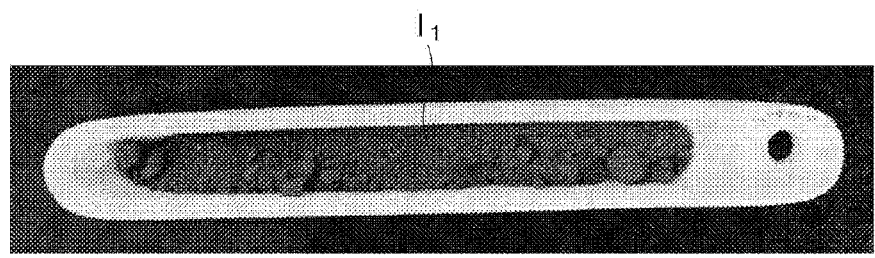
FIG. 12 is an image of dried insoluble solids.

FIG. 12 is an image showing dried insoluble solids.

The insoluble solids dryer 92 is an apparatus for drying the insoluble solids I separated from the aqueous solution Q in the first centrifugal separator 56.

In the first centrifugal separator 56, the insoluble solids I are separated from the distilled water D, but some of the distilled water D may be adsorbed on the surfaces of the insoluble solids I without being separated from the insoluble solids I. As a result, the insoluble solids I discharged from the first centrifugal separator 56 contain 30 to 40% moisture and are present in a slurry state. However, when the insoluble solids I are present in a slurry state, transfer and recycling of the insoluble solids I are not easy. To solve these problems, the insoluble solids dryer 92 is provided.

In the insoluble solids dryer 92, the insoluble solids I discharged from the first centrifugal separator 56 are dried so that the insoluble solids I have a moisture content equal to or less than a predetermined reference moisture content.

The reference moisture content is not particularly limited, and is preferably set differently depending on the purpose of recycling of the insoluble solids I. For example, when the insoluble solids I are recycled as a raw material for cement, the reference moisture content is about 40%. For example, when the insoluble solids I are recycled as a brick refractory or ceramic material, the reference moisture content is about 0.5%. For reference, when the insoluble solids I are recycled as a brick refractory or ceramic material, a relatively low reference moisture content is required as compared with the case of recycling the insoluble solids I as a raw material for cement because a material burned at about 1,200° C. is required.

As shown in FIG. 12, the insoluble solids $I_1$ dried in the insoluble solids dryer 92 are present in the form of dark gray powder due to carbon components adsorbed on the surface thereof. The insoluble solids $I_1$ are transferred to the insoluble solids burning furnace 94.

Figure 13:
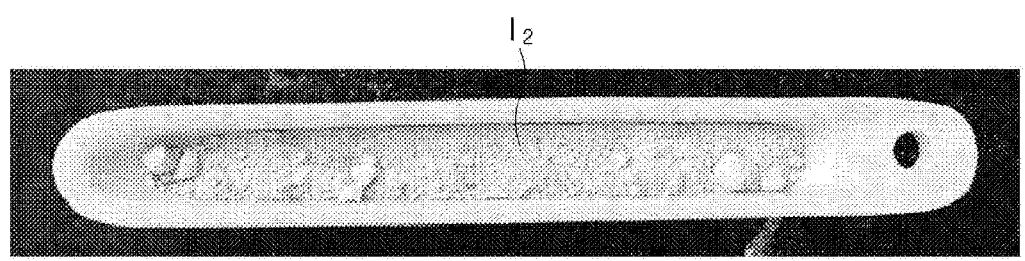
FIG. 13 is an image of burned insoluble solids.
Figure 14:
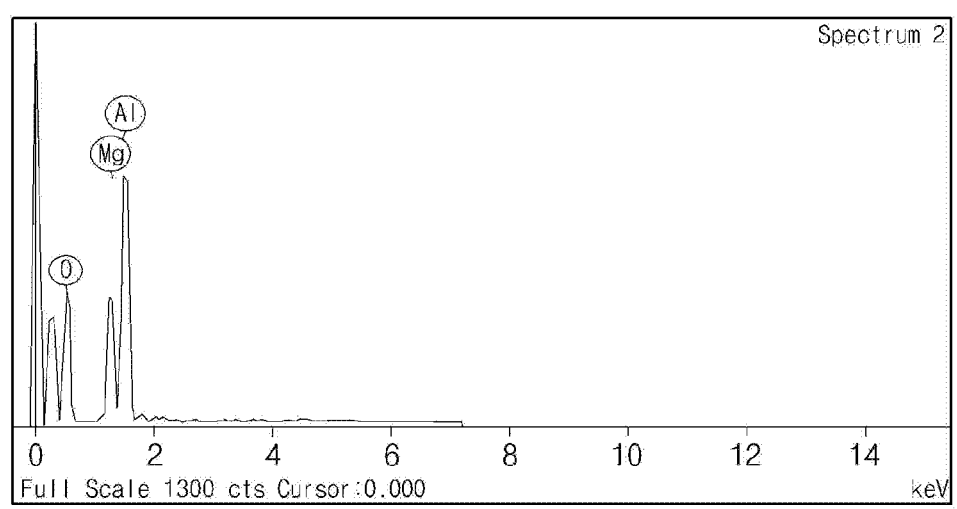
FIG. 14 is an SEM-EDS chart showing results of qualitative analysis of the burned insoluble solids shown in FIG. 13.
Figures 15, 16:
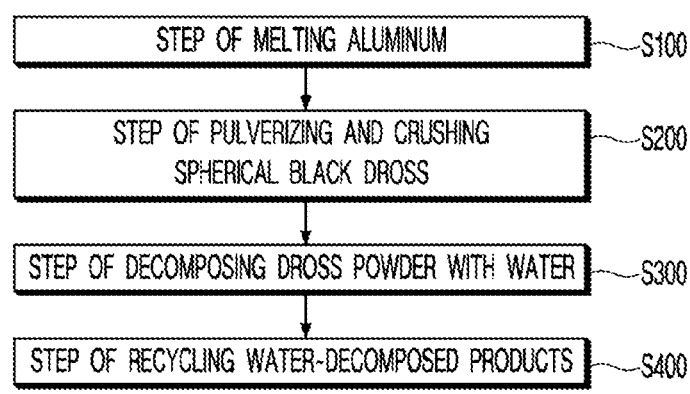
FIG. 15 is a graph showing the composition ratio of the burned insoluble solids shown in FIG. 13.
FIG. 16 is a flowchart schematically showing the method of melting aluminum and recycling dross according to another preferred embodiment of the present invention.

FIG. 13 is an image showing burned insoluble solids, FIG. 14 is an SEM-EDS chart showing the results of qualitative analysis of the burned insoluble solids shown in FIG. 13, and FIG. 15 is a chart showing the composition ratio of the burned insoluble solids shown in FIG. 13.

The insoluble solids burning furnace 94 is an apparatus for burning the insoluble solids $I_1$ dried in the insoluble solids dryer 92.

When aluminum, magnesium, and aluminum alloys in the form of fine powder contained in the dross particulate powder $P_2$ are hydrolyzed, aluminum hydroxide, magnesium hydroxide, and aluminum alloy hydrates (hereinafter, referred to as 'hydrates') may be generated. Since these hydrates are the insoluble solids I, the hydrates are separated from the aqueous solution Q in the first centrifugal separator 56 and transferred to the insoluble solids dryer 92. However, since the hydrates are unstable compared to aluminum oxide, magnesium oxide, and aluminum alloy oxides (hereinafter, referred to as 'oxides'), the insoluble solids I containing the hydrates are not suitable for recycling.

To solve these problems, as shown in FIG. 7, the insoluble solids storage unit 90 includes the insoluble solids burning furnace 94, in which the insoluble solids $I_1$ dried in the insoluble solids dryer 92 are burned, and hydrates contained in the insoluble solids $I_1$ are converted into oxides.

In the insoluble solids burning furnace 94, the insoluble solids $I_1$ are heated to about 800° C. or higher, so that burning reaction of the hydrates is performed. Then, burning of the hydrates proceeds, so that the hydrates are converted into the oxides. At the same time, carbon components adsorbed on the surfaces of the insoluble solids $I_1$ are burned. Therefore, as shown in FIG. 13, the insoluble solids $I_2$ burned in the insoluble solids burning furnace 94 become a light yellow powder. The insoluble solids burning furnace 94 transfers the insoluble solids $I_2$ to the insoluble solids storage chamber 96.

In addition, when the insoluble solids burning furnace 94 has a structure capable of continuously performing a drying process and a burning process like a microwave burning furnace, the above-described insoluble solids dryer 92 may be omitted.

The insoluble solids storage chamber 96 is an apparatus for storing the insoluble solids $I_2$ burned in the insoluble solids burning furnace 94.

The insoluble solids storage chamber 96 may be a conventional storage chamber capable of storing a storage object. The insoluble solids $I_2$ are transferred from the insoluble solids burning furnace 94 to the insoluble solids storage chamber 96, and stored isolated from the outside. As shown in FIGS. 14 and 15, since the insoluble solids $I_2$ mainly include aluminum oxide, magnesium oxide, and aluminum oxide alloys, the insoluble solids $I_2$ are preferably recycled as a ceramic material, a refractory material, or a cement material after an additional recycling process. The additional recycling process for the insoluble solids $I_2$ is not particularly limited. For example, the additional recycling process may include a spinel preparation process, in which aluminum oxide and magnesium oxide are burned at about 2,000° C. and converted into a spinel ($MgAl_2O_4$).

Next, the gas storage unit 100 is an apparatus for storing the hydrolysis gas G collected in the gas collector 54.

The gas storage unit 100 may be a gas storage chamber generally used to store gas. As shown in FIG. 7, the gas storage unit 100 stores the hydrolysis gas G transferred from the gas collector 54.

A general indenter squeezing general black dross by applying an exothermic flux, such as sodium nitrate ($NaNO_3$), to the general black dross. When the squeezed general black dross is decomposed with water, ammonia gas ($NH_3$) and silane gas ($SiH_4$), which are toxic to the human body, are generated from aluminum nitride and aluminum silicate contained in the general black dross. Therefore, gas generated when the squeezed general black dross is decomposed with water is difficult to be recycled.

On the other hand, the hydrolysis gas G generated when the spherical black dross $B_2$ is processed in the black dross recycling device 3 includes hydrogen, methane, ethane, ethene, propane, and propene. These gases are usable as energy sources and are not poisonous as ammonia gas and silane gas described above, so that these gases may be easily recycled. Further, since most of the hydrolysis gas G is hydrogen and methane having excellent characteristics as an energy source, the hydrolysis gas G has a very excellent recycling value.

The hydrolysis gas G is preferably recycled as an energy source for driving the system for melting aluminum and recycling black dross 1 according to the present invention. However, the purpose of recycling is not limited to this, and the hydrolysis gas G may be transferred to the outside by gas transfer facility and may be recycled as an energy source used in various industrial fields, such as heating and power generation.

In addition, in the black dross recycling device 3, the above-described spherical black dross $B_2$ is preferably processed to be recyclable, without being limited thereto. That is, in the black dross recycling device 3, a general black dross formed in a manner different from the spherical black dross $B_2$ may be processed to be recyclable.

Figure 17:
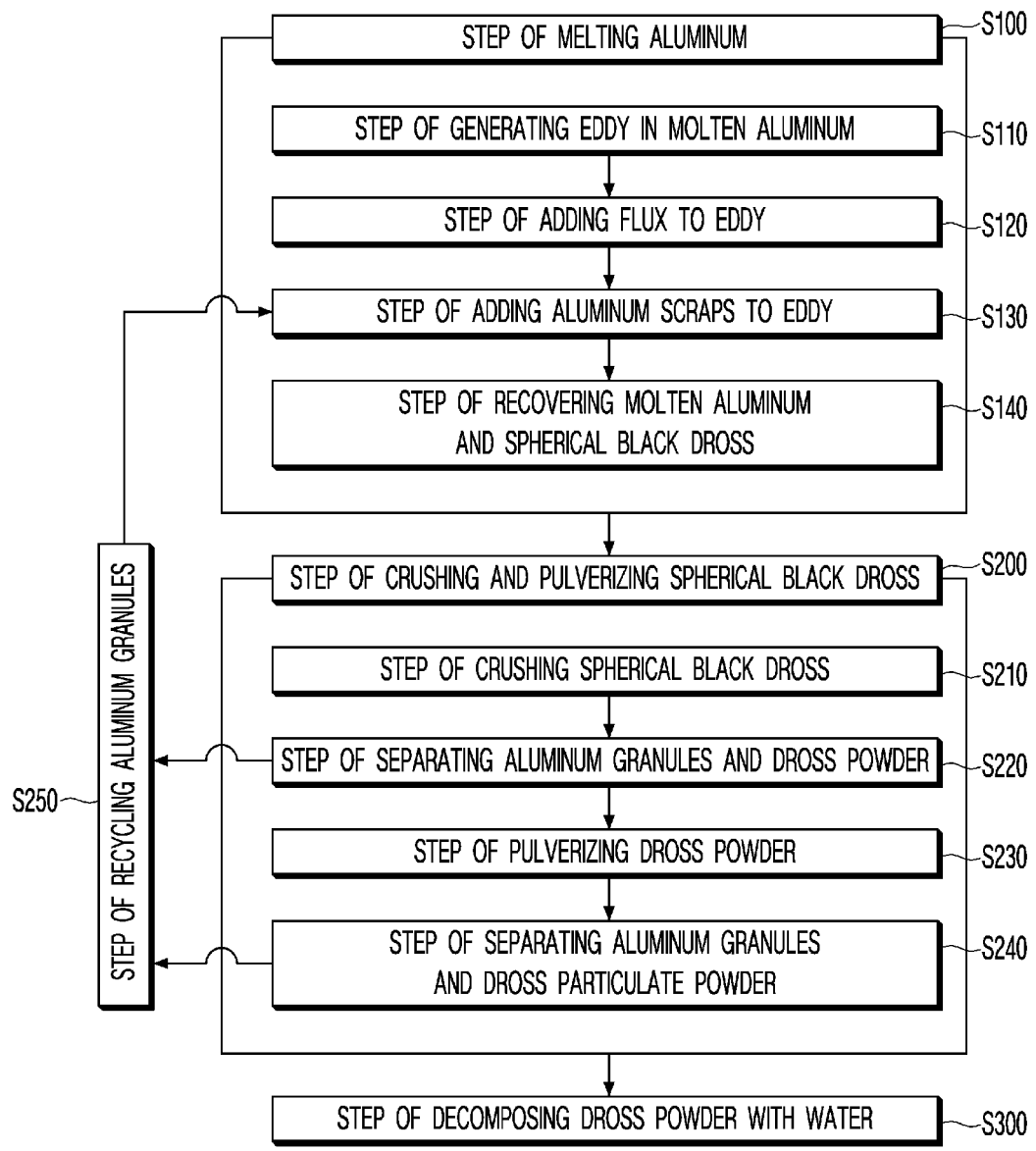
FIG. 17 is a flowchart for explaining the step of melting aluminum and the step of crushing and pulverizing spherical black dross, which are specified in FIG. 16, in detail.

FIG. 16 is a flowchart schematically showing the method of melting aluminum and recycling dross according to another preferred embodiment of the present invention, FIG. 17 is a flowchart for specifically explaining the step of melting aluminum and the step of crushing and pulverizing spherical black dross specified in FIG. 16, and FIG. 18 is a flowchart for specifically explaining the step of decomposing dross powder with water and the step of recycling water-decomposed products specified in FIG. 16.

Referring to FIG. 16, the method of melting aluminum and recycling dross according to a preferred embodiment of the present invention include (S 100) a step of melting aluminum, (S 200) a step of crushing and pulverizing the spherical black dross $B_2$ generated when aluminum is melted, (S 300) a step of water-decomposing the dross particulate powder $P_2$ formed when the spherical black dross $B_2$ is crushed and pulverized, and (S 400) a step of treating at least one of the water-decomposed products of the dross particulate powder $P_2$ so as to be recyclable.

First, step (S 100) of melting aluminum, as shown in FIG. 17, includes (S 110) a step of generating the eddy V in the molten aluminum M, (S 120) a step of adding the flux F to the eddy V so that a molten flux layer is formed on the surface of the molten aluminum M, (S 130) a step of adding the aluminum scraps A to the eddy V so that the aluminum scraps A pass through the molten flux layer, and (S 140) a step of recovering the molten aluminum M, in which the aluminum scraps A are melted, and the spherical black dross $B_2$ generated when the aluminum scraps A are melted in the molten aluminum M.

Step (S 110), in which the eddy V is generated in the molten aluminum M, may be performed by stirring the molten aluminum M using the above-described eddy unit 21 capable of rotating to generate the eddy V descending in a spiral in the molten aluminum M.

Step (S 120), in which the flux F is added to the eddy V, may be performed by adding the predetermined flux F to the eddy V generated in the molten aluminum M in step (S 110). Preferably, the flux F may include 93 to 97 parts by weight of a mixture, in which sodium chloride (NaCl) and potassium chloride (KCl) are mixed in equal parts by weight, and 3 to 7 parts by weight of a cryolite (potassium cryolite). More preferably, the flux F may include 47.5 parts by weight of sodium chloride (NaCl), 47.5 parts by weight of potassium chloride (KCl), and 5 parts by weight of potassium aluminum fluoride ($KAlF_4$). When the flux F is added to the eddy V, the flux F is melted and the melted flux F floats on the surface of the molten aluminum M to form a molten flux layer, i.e., molten salt layer.

Step (S 130), in which the aluminum scraps A are added to the eddy V, may be performed by adding the predetermined aluminum scraps A to the eddy V formed in the molten aluminum M so that the aluminum scraps A pass through the molten flux layer formed in step (S 120). Preferably, the aluminum scraps A may be aluminum used beverage cans scraps (UBCs, A 3XXX series, A 5XXXX series) mainly including aluminum, magnesium, and aluminum alloys. The aluminum scraps A added to the eddy V are melted in the molten aluminum M. At the same time, inclusions contained in the molten aluminum M are captured in the molten flux layer, i.e., the flux F, to form the black dross $B_1$. The black dross $B_1$ is repeatedly descended and floated by the eddy V in the molten aluminum M, so that the black dross $B_1$ is collected into a spherical shape to form the spherical black dross $B_2$.

Step (S 140), in which the molten aluminum M and the spherical black dross $B_2$ are recovered, may be performed by discharging the molten aluminum M, in which the aluminum scraps A are melted, through the outlets of the above-described aluminum melting furnace 2, and by draining the spherical black dross $B_2$ floated on the surface of the molten aluminum M from the molten aluminum M using the above-described separation unit 27.

Next, step (S 200), in which the spherical black dross $B_2$ are crushed and pulverized, includes (S 210) a step of crushing the spherical black dross $B_2$ recovered from the molten aluminum M, (S 220) a step of separating the aluminum granules N and the dross powder $P_1$, (S 230) a step of pulverizing the dross powder $P_1$, and (S 240) a step of separating the aluminum granules N and the dross particulate powder $P_2$.

Step (S 210), in which the spherical black dross $B_2$ is crushed, may be performed by crushing the spherical black dross $B_2$ recovered in step (S 140) using the above-described crusher 41.

Step (S 220), in which the aluminum granules N and the dross powder $P_1$ are separated, may be performed by separating the aluminum granules N and the dross powder $P_1$ in the crushed products of the spherical black dross $B_2$ formed in step (S 210) using the above-described first separating member 42. For example, the first separating member 42 may be a vibration screen having a particle diameter of about 10 mm.

Step (S 230), in which the dross powder $P_1$ is pulverized, may be performed by pulverizing the dross powder $P_1$ separated from the aluminum granules N in step (S 220) using the pulverizer 43.

Step (S 240), in which the aluminum granules N and the dross particulate powder $P_2$ are separated, may be performed by separating the aluminum granules N and the dross particulate powder $P_2$ in the pulverized products of the dross powder $P_1$ formed in step (230) using the above-described second separating member 44. For example, the second separating member 44 may be a trommel screen having a particle diameter of about 0.5 mm.

In addition, step (S 200), in which the spherical black dross $B_2$ is crushed and pulverized, may further include (S 250) a step of recycling the aluminum granules N separated from the dross powder $P_1$ and the dross particulate powder $P_2$ in steps (S 220) and (S 240). For example, step (S 250), in which the aluminum granules N are recycled, may be performed by adding the aluminum granules N to the eddy V formed in the above-described molten aluminum M.

Next, step (S 300), in which the dross particulate powder $P_2$ is decomposed with water, may be performed by decomposing the dross particulate powder $P_2$ with water, which is separated from the aluminum granules N again in step (S 240), using the reactor 52. Preferably, in the reactor 52, a mixture of the dross particulate powder $P_2$ and water mixed at a ratio of 1:2 is stirred so that the dross particulate powder $P_2$ is decomposed with water. When the dross particulate powder $P_2$ is decomposed with water, the dross particulate powder $P_2$ is decomposed into water-decomposed products including the hydrolysis gas G, the soluble solids S, and the insoluble solids I.

Next, as shown in FIG. 18, step (S 400), in which at least one of the water-decomposed products of the dross particulate powder $P_2$ is treated so as to be recyclable, includes (S 410) a step of collecting and separating the hydrolysis gas G from the aqueous solution Q generated when the soluble solids S are dissolved in water, (S 420) a step of separating the insoluble solids I and the aqueous solution Q from each other, (S 430) a step of treating the hydrolysis gas G so as to be recyclable, (S 440) a step of treating the soluble solids S so as to be recyclable, and (S 450) a step of treating the insoluble solids I so as to be recyclable.

Step (S 410), in which the hydrolysis gas G is collected and separated from the aqueous solution Q, may be performed by collecting the hydrolysis gas G from the aqueous solution Q contained in the above-described reactor 52 using the gas collector 54.

As shown in FIG. 18, step (S 420), in which the insoluble solids I and the aqueous solution Q are separated from each other, includes (S 421) a step of centrifugally separating the aqueous solution Q and the insoluble solids I, (S 422) a step of washing the insoluble solids I with distilled water, and (S 423) a step of centrifugally separating the insoluble solids I and distilled water.

Step (S 421), in which the insoluble solids I and the aqueous solution Q are centrifugally separated, may be performed by centrifugally separating the insoluble solids I and the aqueous solution Q separated from the hydrolysis gas G in step (S 410) using the above-described first centrifugal separator 56.

Step (S 422), in which the insoluble solids I are washed with distilled water, may be performed by washing the insoluble solids I using distilled water so that chlorine adsorbed to the insoluble solids I in step (S 421) is separated from the insoluble solids I. Even after the insoluble solids I and the aqueous solution Q are centrifugally separated in step (S 421), some of the aqueous solution Q may not be separated and adsorbed to the insoluble solids I. In this aqueous solution Q, the soluble solids S containing chloride salts are melted. Accordingly, to remove chloride salts adsorbed to the insoluble solids I, the insoluble solids I are washed with distilled water. Step (S 422), in which the insoluble solids I are washed with distilled water, is preferably performed using the distilled water D generated in step (S 445) to be described later, without being limited thereto.

Step (S 423), in which the insoluble solids I and distilled water are centrifugally separated, may be performed by centrifugally separating the insoluble solids I and the distilled water D using the above-described first centrifugal separator 56 after step (S 422).

Additionally, steps (S 422) and (S 423) may be repeated until the concentration of chloride salts adsorbed to the insoluble solids I is less than or equal to a predetermined reference concentration. The reference concentration is preferably about 300 ppm, without being limited thereto.

As shown in FIG. 18, step (S 430), in which the hydrolysis gas G is treated so as to be recyclable, includes (S 431) a step of removing moisture contained in the hydrolysis gas G, (S 432) a step of separating and purifying the hydrolysis gas G from which moisture is removed, and (S 433) a step of storing the separated and purified hydrolysis gas G.

Step (S 431), in which moisture contained in the hydrolysis gas G is removed, may be performed by removing moisture contained in the hydrolysis gas G collected by the gas collector 54 in step (S 410) using the above-described moisture trap unit 54b, moisture removal unit (not shown), and desulfurization unit (not shown).

Step (S 432), in which the hydrolysis gas G is separated and purified, may be performed by separating and purifying the hydrolysis gas G using the above-described gas separation and purification unit 54a so that the purity of actually recyclable gas in the hydrolysis gas G from which moisture is removed in step (S 431) is increased, or specific gas suitable for recycling is separated from other gases in the hydrolysis gas G.

Step (S 433), in which the hydrolysis gas G is stored, may be performed by storing the hydrolysis gas G separated and purified in step (S 432) in the above-described gas storage unit 100.

As shown in FIG. 18, step (S 440), in which the soluble solids S are treated so as to be recyclable, includes (S 441) a step of vacuum-distilling the aqueous solution Q at a predetermined temperature and pressure to precipitate the soluble solids S from the aqueous solution Q, (S 442) a step of centrifugally separating the soluble solids S and the aqueous solution $Q_1$, (S 443) a step of drying the soluble solids S, and (S 444) a step of storing the soluble solids $S_1$.

Step (S 441), in which the aqueous solution Q is vacuum-distilled to precipitate the soluble solids S, may be performed by vacuum-distilling the aqueous solution centrifugally separated from the insoluble solids I in step (S 421) at a predetermined vacuum distillation temperature and vacuum distillation pressure using the above-described vacuum distiller 62. The vacuum distillation temperature is preferable 40 to 70° C., and the vacuum distillation pressure is preferably 12 to 40 kPa, without being limited thereto.

Step (S 442), in which the soluble solids S and the aqueous solution $Q_1$ are centrifugally separated, may be performed by centrifugally separating the soluble solids S precipitated from the aqueous solution Q in step (S 441) and the aqueous solution $Q_1$, which is remained after the soluble solids S are precipitated, using the above-described second centrifugal separator 66.

Step (S 443), in which the soluble solids S are dried, may be performed by drying the soluble solids S, which are centrifugally separated from the aqueous solution $Q_1$ in step (S 442), using the above-described soluble solids dryer 72. Step (S 443) is preferably performed until the moisture content of the soluble solids S is less than 0.3%, without being limited thereto.

Step (S 444), in which the soluble solids $S_1$ are stored, may be performed by storing the soluble solids $S_1$ dried in step (S 443) using the above-described soluble solids storage chamber 74.

Additionally, step (S 440), in which the soluble solids S are treated so as to be recyclable, may further include step (S 445) of condensing the water vapor T generated when the aqueous solution Q is vacuum-distilled in step (S 441) to generate the distilled water D. Step (S 445), in which the distilled water D is generated, may be performed by condensing the water vapor T generated in step (S 441) using the above-described condenser 64. The distilled water D generated in step (S 445) may be transferred to the above-described first centrifugal separator 56 and used when the insoluble solids I are washed in step (S422).

Additionally, step (S 440), in which the aqueous solution Q is vacuum-distilled to precipitate the soluble solids S, may be performed by vacuum distilling any one of the aqueous solution Q centrifugally separated from the insoluble solids I in step (S 421) and the aqueous solution $Q_1$ centrifugally separated from the soluble solids S in step (S 442). That is, the aqueous solution $Q_1$ is re-transferred to the above-described vacuum distiller 62 (S 446), and vacuum distillation is performed again to precipitate the soluble solids S melted in the aqueous solution $Q_1$ for recycling.

As shown in FIG. 18, step (S 450), in which the insoluble solids I are treated so as to be recyclable, includes step (S 451) of drying the insoluble solids I, step (S 452) of burning the insoluble solids $I_1$, and step (S 453) of storing the insoluble solids $I_2$.

Step (S 451), in which the insoluble solids I are dried, may be performed by evaporating moisture adsorbed to the insoluble solids I without not being separated therefrom in step (S 420) using the above-described insoluble solids dryer 92. When the insoluble solids I are recycled as a raw material for cement, step (S 451) of drying the insoluble solids I is preferably performed until the moisture content of the insoluble solids I is less than 40%. In addition, when the insoluble solids I are recycled as a brick refractory or ceramic material, step (S 451) of drying the insoluble solids I is preferably performed until the moisture content of the insoluble solids I is less than 0.5%, without being limited thereto.

Step (S 452), in which burning of the insoluble solids $I_1$ is performed, may be performed by burning the insoluble solids $I_1$ dried in step (S 451) using the above-described insoluble solids burning furnace 94. The insoluble solids $I_1$ may include unstable hydroxides, such as aluminum hydroxide, magnesium hydroxide, and aluminum alloy hydrates. Accordingly, burning of insoluble solids $I_1$ is performed, so that the hydroxides are converted into aluminum oxide, magnesium oxide, aluminum alloy oxides, which have relatively stable properties.

Step (S 453), in which the insoluble solids $I_2$ are stored, may be performed by storing the insoluble solids $I_2$ burned in step (S 452) in the above-described insoluble solids storage chamber 96.

Although the present invention has been described through limited examples and figures, the present invention is not intended to be limited to the examples. Those skilled in the art will appreciate that various modifications, additions and substitutions are possible, without departing from the scope and spirit of the invention.

The invention claimed is:

1. A system for melting aluminum and recycling black dross, comprising:
   an aluminum melting furnace responsible for melting aluminum scraps in molten aluminum and a black dross recycling device configured for treating and recycling black dross generated when the aluminum scraps are melted in the molten aluminum,
   wherein the aluminum melting furnace comprises:
   a heating chamber provided with heating units responsible for heating the molten aluminum; and
   a melting chamber provided with an eddy unit responsible for generating an eddy descending in a spiral in the molten aluminum, a flux supply unit responsible for adding a flux to the eddy, and a raw material supply unit responsible for adding the aluminum scraps to the eddy, wherein, in the eddy unit, black dross formed when inclusions contained in the molten aluminum are captured by the flux is repeatedly descended and floated in the molten aluminum through the eddy, so that the black dross is collected into a spherical shape to form spherical black dross, and
   the black dross recycling device is configured for treating and recycling the spherical black dross,
   wherein the black dross recycling device comprises:
   a crushing/pulverizing unit responsible for crushing and pulverizing the spherical black dross to split the spherical black dross into aluminum granules and dross particulate powder;
   a water decomposition unit responsible for reacting the dross particulate powder with water to decompose the dross particulate powder into soluble solids and insoluble solids; and
   a precipitation unit responsible for distilling an aqueous solution generated when the soluble solids are dissolved in the water so that the soluble solids are precipitated from the aqueous solution,
   wherein the water decomposition unit comprises:
   a reactor responsible for stirring the dross particulate powder with water; and
   a first centrifugal separator responsible for centrifugally separating the aqueous solution and the insoluble solids.

2. The system according to claim 1, wherein the black dross recycling device further comprises:
   a soluble solids storage unit responsible for drying and storing the soluble solids precipitated in the precipitation unit;
   an aluminum granule storage unit responsible for storing the aluminum granules; and
   an insoluble solids storage unit responsible for drying and storing the insoluble solids.

3. The system according to claim 1, wherein the crushing/pulverizing unit comprises:
   a crusher responsible for crushing the spherical black dross to split the spherical black dross into aluminum granules and dross powder; and
   a pulverizer responsible for pulverizing the dross powder to split the dross powder into aluminum granules and the dross particulate powder.

4. The system according to claim 3, wherein the crushing/pulverizing unit further comprises:
   a first separating member that is disposed between the crusher and the pulverizer and is responsible for separating the aluminum granules and the dross powder from each other, transferring the aluminum granules to the aluminum granule storage unit, and transferring the dross powder to the pulverizer; and
   a second separating member that is disposed between the pulverizer and the water decomposition unit and is responsible for separating the aluminum granules and the dross particulate powder from each other, transferring the aluminum granules to the aluminum granule storage unit, and transferring the dross particulate powder to the water decomposition unit.

5. The system according to claim 1, wherein the aluminum scraps comprise at least aluminum used beverage cans scraps, and the flux comprises 93 to 97 parts by weight of a mixture, in which sodium chloride (NaCl) and potassium chloride (KCl) are mixed in equal parts by weight, and 3 to 7 parts by weight of a cryolite (potassium cryolite).

6. The system according to claim 1, wherein the precipitation unit comprises:
   a vacuum distiller responsible for vacuum-distilling the aqueous solution at predetermined vacuum distillation temperature and vacuum distillation pressure to precipitate the soluble solids; and
   a second centrifugal separator responsible for centrifugally separating the soluble solids precipitated in the vacuum distiller and the aqueous solution.

7. The system according to claim 6, wherein, in the first centrifugal separator, the insoluble solids separated from the aqueous solution by centrifugation are washed with the distilled water generated by vacuum distillation.

8. A system for melting aluminum and recycling black dross, comprising:
   an aluminum melting furnace responsible for melting aluminum scraps in molten aluminum and a black dross recycling device configured for treating and recycling black dross generated when the aluminum scraps are melted in the molten aluminum,
   wherein the aluminum melting furnace comprises:
   a heating chamber provided with heating units responsible for heating the molten aluminum; and
   a melting chamber provided with an eddy unit responsible for generating an eddy descending in a spiral in the molten aluminum, a flux supply unit responsible for adding a flux to the eddy, and a raw material supply unit responsible for adding the aluminum scraps to the eddy,
   wherein, in the eddy unit, black dross formed when inclusions contained in the molten aluminum are captured by the flux is repeatedly descended and floated in the molten aluminum through the eddy, so that the black dross is collected into a spherical shape to form spherical black dross, and the black dross recycling device is configured for treating and recycling the spherical black dross, wherein the black dross recycling device comprises:

a crushing/pulverizing unit responsible for crushing and pulverizing the spherical black dross to split the spherical black dross into aluminum granules and dross particulate powder;

a water decomposition unit responsible for reacting the dross particulate powder with water to decompose the dross particulate powder into soluble solids and insoluble solids; and a precipitation unit responsible for distilling an aqueous solution generated when the soluble solids are dissolved in the water so that the soluble solids are precipitated from the aqueous solution, wherein the water decomposition unit further comprises a gas collector responsible for collecting hydrolysis gas generated when the dross particulate powder is reacted with water.

9. The system according to claim 8, wherein the black dross recycling device further comprises a gas storage unit responsible for storing the hydrolysis gas collected in the gas collector.

\* \* \* \* \*